Sept. 27, 1938.   U. M. W. KÖLM   2,131,226
TABULATING MACHINE
Filed June 7, 1934   14 Sheets-Sheet 1

Sept. 27, 1938.  U. M. W. KÖLM  2,131,226
TABULATING MACHINE
Filed June 7, 1934  14 Sheets-Sheet 2

INVENTOR.
BY Ulrich M. W. Kölm
ATTORNEYS.

Sept. 27, 1938. U. M. W. KÖLM 2,131,226
TABULATING MACHINE
Filed June 7, 1934 14 Sheets-Sheet 3

INVENTOR.
Ulrich M. W. Kölm
BY
ATTORNEYS.

Sept. 27, 1938.  U. M. W. KÖLM  2,131,226
TABULATING MACHINE
Filed June 7, 1934  14 Sheets-Sheet 4

INVENTOR.
Ulrich M. W. Köhm
BY
W. M. Wilson
ATTORNEYS.

Sept. 27, 1938.  U. M. W. KÖLM  2,131,226
TABULATING MACHINE
Filed June 7, 1934  14 Sheets-Sheet 5

FIG.10.

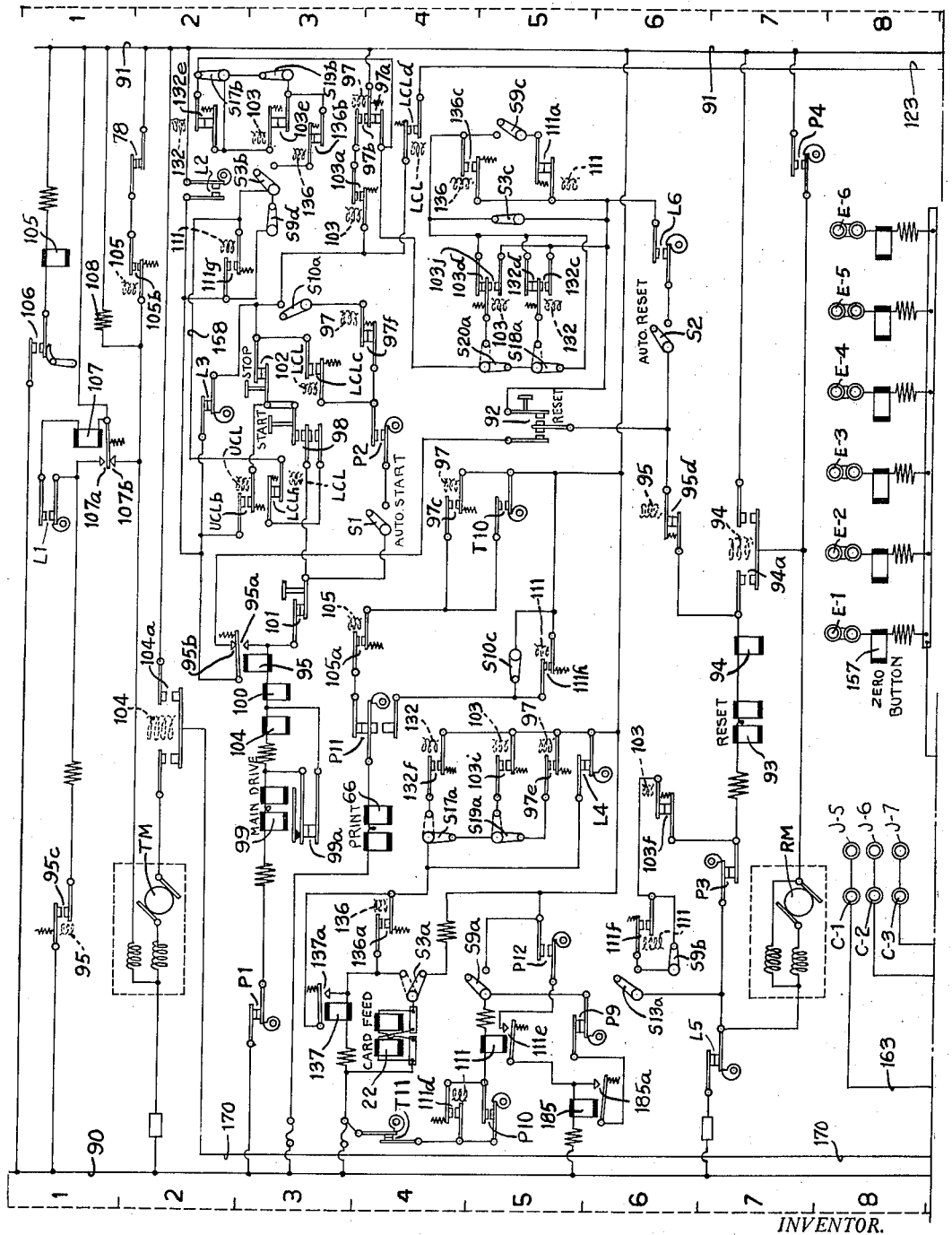

Sept. 27, 1938.  U. M. W. KÖLM  2,131,226
TABULATING MACHINE
Filed June 7, 1934  14 Sheets-Sheet 7

INVENTOR.
Ulrich M. W. Kölm
BY
ATTORNEYS.

Sept. 27, 1938.  U. M. W. KÖLM  2,131,226
TABULATING MACHINE
Filed June 7, 1934  14 Sheets-Sheet 9

INVENTOR.
Ulrich M. W. Kölm
BY
W. M. Wilson
ATTORNEYS.

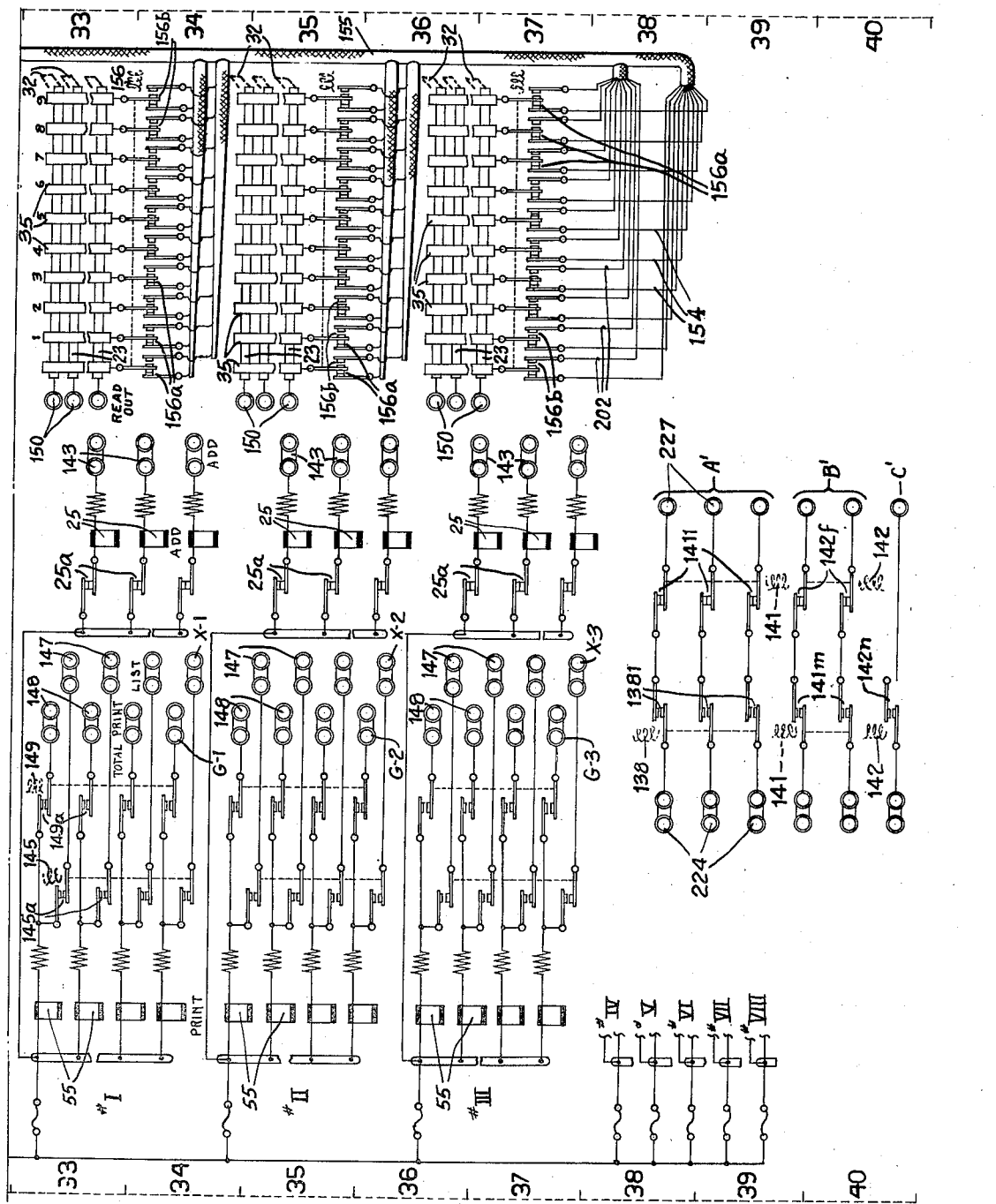

Sept. 27, 1938.  U. M. W. KÖLM  2,131,226
TABULATING MACHINE
Filed June 7, 1934  14 Sheets-Sheet 11

INVENTOR.
Ulrich M. W. Köhn
BY
W. M. Wilson
ATTORNEYS.

Sept. 27, 1938.  U. M. W. KÖLM  2,131,226
TABULATING MACHINE
Filed June 7, 1934  14 Sheets-Sheet 12
FIG.14.
| CYCLES | ACC. II | D.S.R. | ACC. III | D.S.R. | ACC. IV | D.S.R. | ACC. V | D.S.R. |
|---|---|---|---|---|---|---|---|---|
| 1 ITEM ENTERING | +20 | | −50 | | +10 | | +64 | |
| ACC. SETTING | 20 | EVEN | 9949 | ODD | 10 | EVEN | 64 | EVEN |
| 2 ITEM ENTERING | −2 | ODD | +30 | — | −23 | ODD | −42 | ODD |
| | (9997) | | | | (9976) | | (9957) | |
| | 10017 | | | | | | 10021 | |
| | TRANS-1 | EVEN | | | — | — | TRANS-1 | EVEN |
| ACC. SETTING | 18 | | 9979 | | 9986 | | 22 | |
| 3 1ST TRANSFER CYCLE | | | →18 | — | | | | |
| ACC. SETTING | | | 9997 | — | 9986 | — | 22 | |
| 4 2ND TRANSFER CYCLE | | | | | →9997 | EVEN | | |
| | | | | | 19983 | | | |
| | | | | | TRANS-1 | ODD | | |
| ACC. SETTING | | | | | 9984 | | 22 | |
| 5 3RD TRANSFER CYCLE | | | | | | | →9984 | ODD |
| | | | | | | | 10006 | |
| | | | | | | | TRANS-1 | EVEN |
| | | | | | | | 7 | |
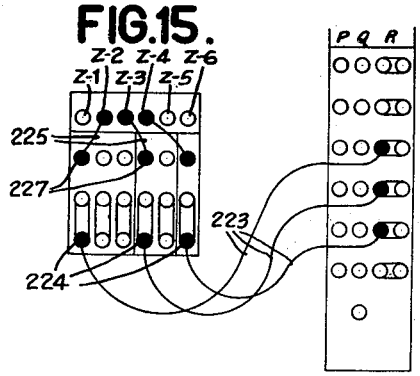
FIG.15.
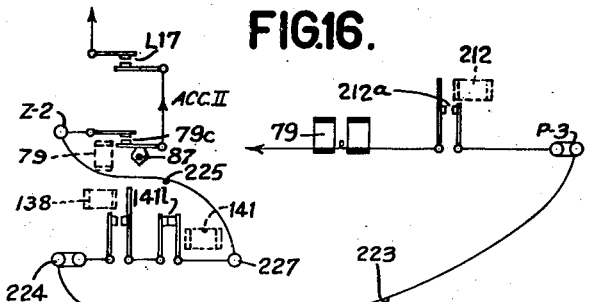
FIG.16.
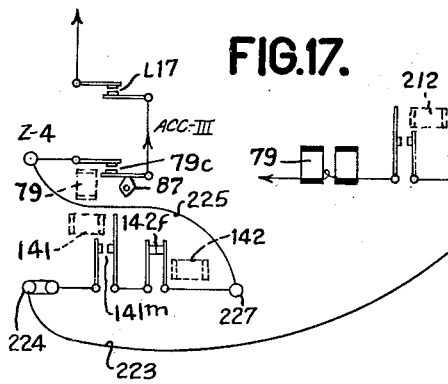
FIG.17.
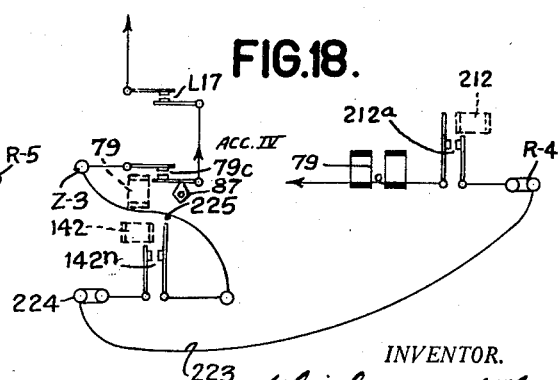
FIG.18.
INVENTOR.
Ulrich M. W. Kölm
BY
ATTORNEYS.

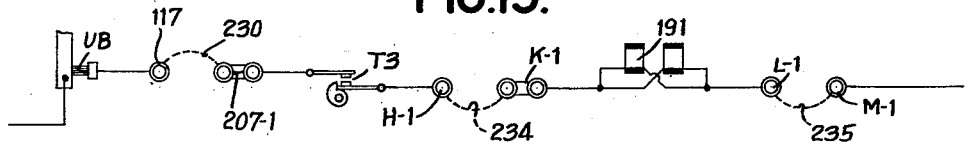
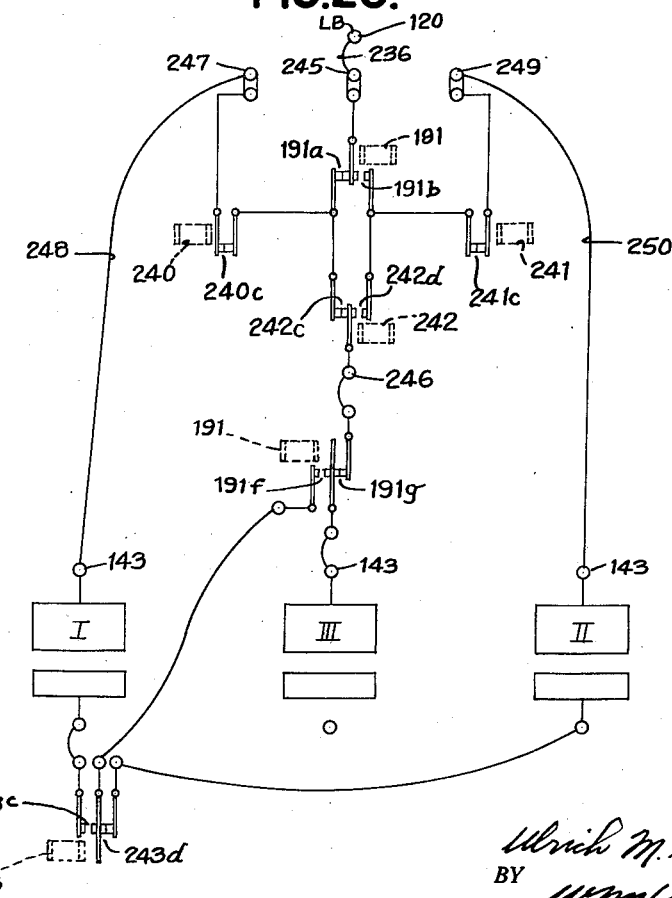

Sept. 27, 1938.  U. M. W. KÖLM  2,131,226

TABULATING MACHINE

Filed June 7, 1934   14 Sheets-Sheet 14

FIG.21.

Patented Sept. 27, 1938

2,131,226

UNITED STATES PATENT OFFICE 2,131,226

TABULATING MACHINE

Ulrich M. W. Kölm, Berlin, Germany, assignor to International Business Machines Corporation, New York, N. Y., a corporation of New York Application June 7, 1934, Serial No. 729,385
In Germany July 5, 1933

24 Claims. (Cl. 235—61.7)

This invention relates to record card controlled accounting and statistical machines and the principal object is to provide such a machine which will have the flexibility necessary for the performance of various types of problems.

Another object of the invention is to provide novel means by which the true algebraic sum of a number of positive and negative amounts can be obtained and to provide an improved controlling mechanism for such a machine.

According to the present invention there is provided a plurality of accumulators, reading-out mechanism for each by means of which the amount registered by any one accumulator can be read out and entered in any other accumulator, and controlling means operable automatically to cause the amounts in predetermined accumulators to be read out and entered into predetermined other accumulators in a succession of cycles. Preferably, the controlling means is adjustable at will to vary the accumulators involved in any one cycle.

In order to allow the subtraction of an amount registered in one accumulator from that registered in another, the reading-out mechanism may be operable to enter the complement of some or all the amounts read out.

According to another aspect of the present invention, there is provided a record card controlled machine in which the reading-out mechanism of either of a pair of accumulators may be selectively associated with a third accumulator to transfer the selected total thereto. With such arrangement, balances may be obtained in a more improved manner than has heretofore been possible on machines of this type and discrepancies between minor and major totals which have heretofore been liable to occur where the original information is read in detail from the record cards to independent accumulators are avoided.

With the present arrangement detailed information is entered into only a single accumulator which may be set to print its total and transfer the same to a second accumulator upon a minor group change. Upon an intermediate group change the total of the second accumulator may be transferred to the third to build up a major total. It will be seen, therefore, that if the final total on the major accumulator agrees with a known balancing figure, there is assurance that the minor and intermediate individual totals are also correct. In prior methods of balancing it was quite possible for the major total to be correct but for either the minor or intermediate or both to be incorrect.

The machine is provided with group control mechanism adapted for minor, intermediate and major group number control and is adapted to perform various types of cyclic operations upon a change in the group control numbers of successively analyzed record cards. Upon a selected group change, the machine may perform one, two, or three transfer cycles of operation in accordance with a predetermined set-up. These transfer cycles may follow immediately after the completion of the analysis of a group of cards where the machine may be conditioned to effect a total printing cycle wherein the amounts standing on the accumulators may be printed before transferring takes place. The amount transferred between accumulators may be the amount standing on the accumulator or the complement thereof, thus causing either an addition to or subtraction from the amount standing in the other accumulator.

A more specific object of the invention is to provide mechanism for obtaining balances from groups of cards, one of which cards may contain a balance which is either a negative or a positive amount and the remaining cards contain either negative or positive detail amounts. In the operation of the machine, three accumulators are utilized, one adapted to receive amounts from the balance card and the other two separately receive the negative and positive detail amounts. Provision is made whereby a balance card containing a negative amount will condition the machine to cause all detail negative amounts to be also entered into the balance accumulator and if the balance card amount is positive, to cause all positive detail amounts to enter into the balance accumulator so that at the completion of the analysis of a group of cards one of the accumulators will contain the total of all positive detail amounts, a second will contain the total of all negative detail amounts, and the third will contain either the total of all negative amounts or all positive amounts. If this total is negative, the machine will automatically transfer to it in complementary form the total of the positive detail amounts and if it is positive, it will receive the total of the negative detail amounts in complementary form. The balance card determines, in advance of the adding operations, which detail amounts shall be entered into the balance accumulator and also from which other accumulator the balance accumulator shall receive a transferred entry after the entire group of cards has been analyzed.

A further object of the invention is to provide novel group indicating mechanism controlled in accordance with the character of the group following which a group number is to be printed. When the machine is operated under minor, intermediate and major group control, a change in the minor control number will bring about the group indication of only the minor group number. A change in intermediate control will bring about the indication of the minor and intermediate group numbers, and a change in the major control will bring about an indication of all three group numbers. Heretofore in machines of this character, a change in any group number brought about an indication of all the group numbers, resulting in undesirable repetition of those that have not changed.

The term "transferring" as used in connection with the present invention may be defined as the operation in which an amount from one accumulator is read therefrom and entered into another accumulator and wherein the amount standing in the first or original accumulator is not obliterated but remains standing therein.

Various other objects and advantages of the invention will be obvious from the following particular description of one form of mechanism embodying the invention or from an inspection of the accompanying drawings; and the invention also constitutes certain new and novel features of construction and combination of parts hereinafter set forth and claimed.

In the drawings:

Fig. 10 is a view showing the arrangement of the plugboard of the machine through which the various cycles of operation are selectively controlled;

Figure 12:
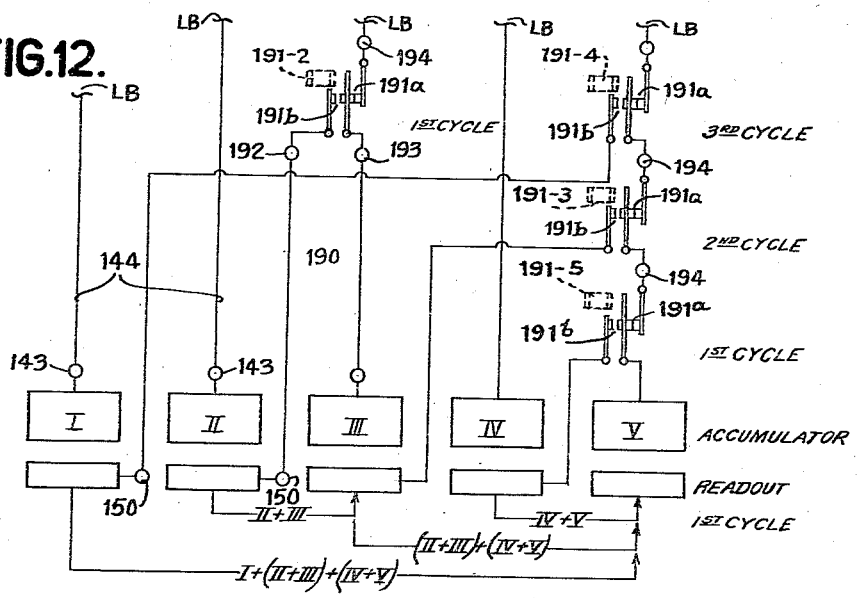
Figure 13:
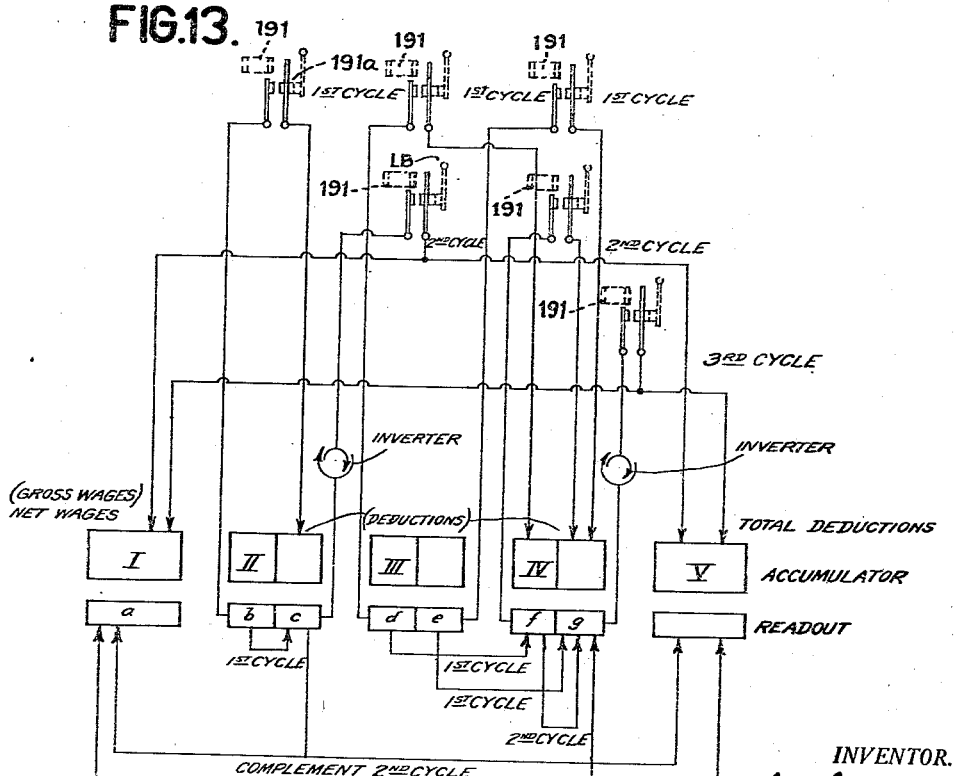

Figs. 11, 11a, 11b, 11c, and 11d, taken together and placed one below the other in the order named, constitute a wiring diagram of the electric circuits of the machine;

Fig. 12 is a diagrammatic illustration of the manner in which a cross-adding problem is handled by the machine;

Fig. 13 is a diagrammatic showing of the manner in which combined cross-adding and cross-subtracting are handled by the machine;

Fig. 14 is a view showing the operations involved in the solution of a cross-adding problem;

Fig. 15 is a detail showing certain sockets of the plugboard and the manner of their interconnection;

Figs. 16, 17, and 18 are fragmentary circuits showing the elements operatively associated through the plug connections in Fig. 15.

Fig. 19 is a fragmentary circuit completed under control of a special designation in a record card;

Fig. 20 is a diagrammatic showing of the manner in which cross-balancing is carried out in the machine.

Figure 21:
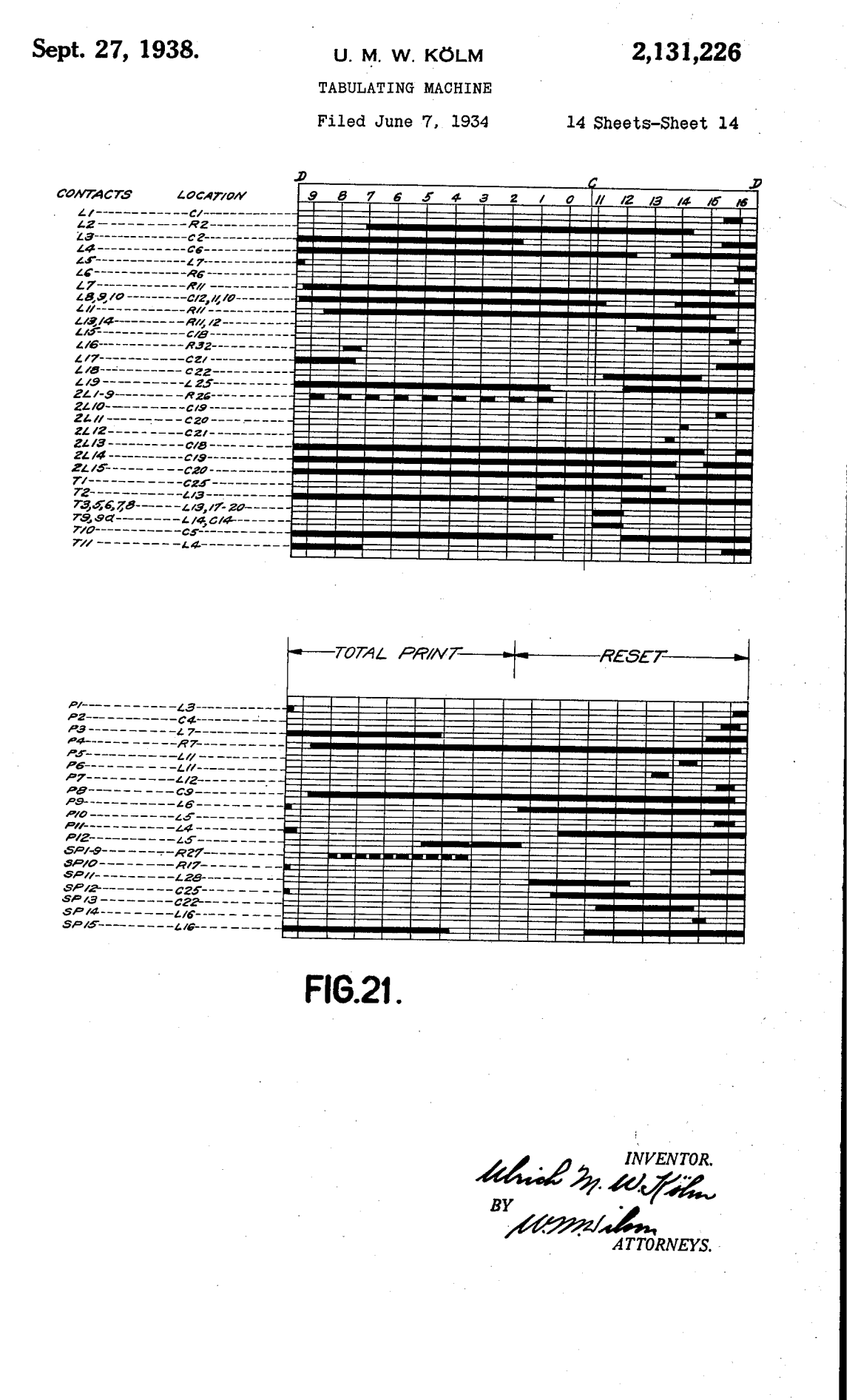

Fig. 21 is a timing diagram of the cam controlled contact devices.

General description

The separate units of the machine will first be described in sufficient detail for an understanding of their construction and their manner of operation. Following this, the circuit diagram will be explained and the complete operation of the entire machine set forth.

The mechanical structure of the machine is substantially similar to that shown in Patent No. 1,762,145, issued to G. F. Daly and R. E. Page on on June 10, 1930, Patent No. 1,916,986, issued to R. E. Page and C. D. Lake on July 4, 1933, Patent No. 1,921,454, issued to G. F. Daly on August 8, 1933, and also in the patent of C. D. Lake and G. F. Daly, No. 1,976,617, granted October 9, 1934. Only sufficient structure will therefore be herein described to point out wherein departure has been made from previous arrangements.

Figure 1:
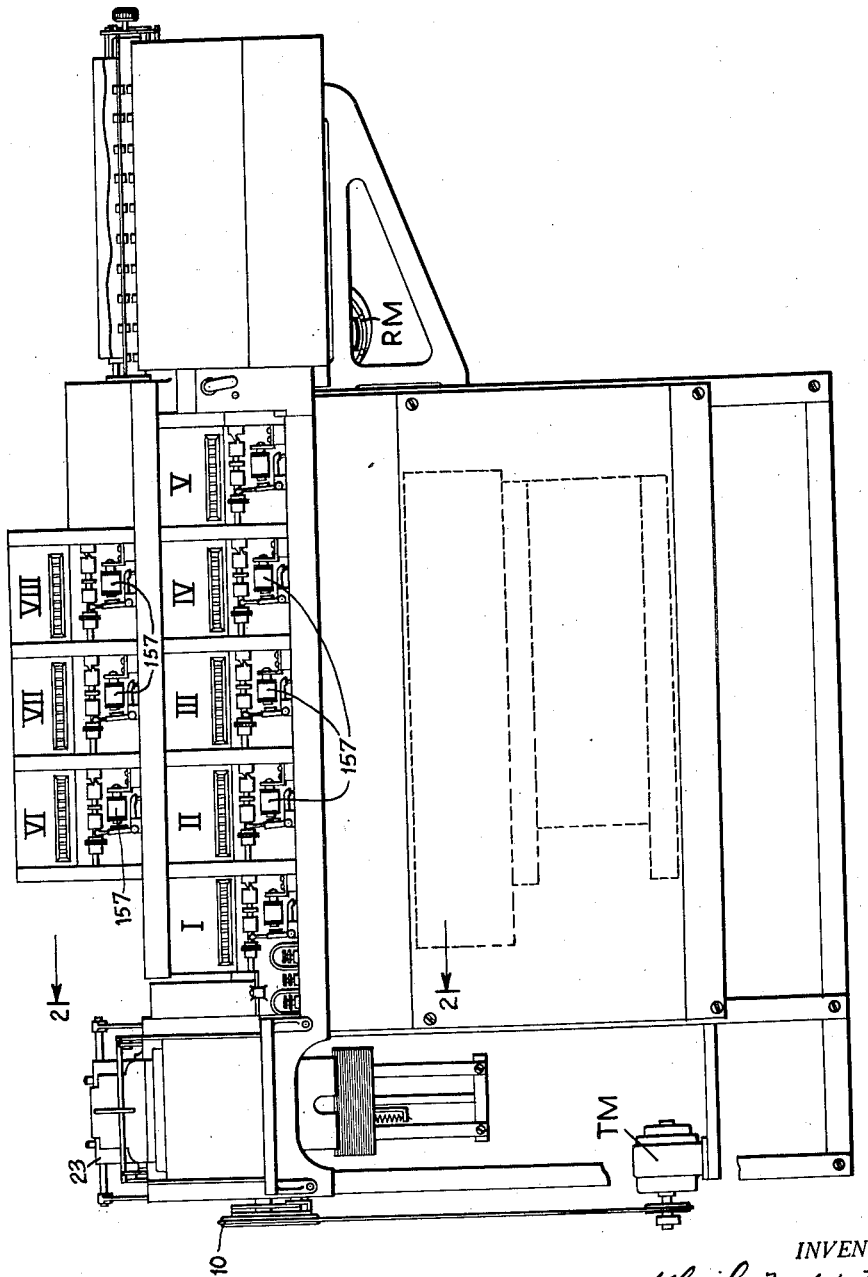
Fig. 1 is a view of the entire machine showing the location of the various units.

Referring to Fig. 1, the machine comprises, generally, a card feeding and analyzing section at the left end thereof which feeds the record cards to the analyzing devices where they are sensed by the analyzing mechanism. The accumulating mechanism is located in the center of the machine and comprises eight accumulators designated I to VIII. A clutching mechanism is provided intermediate the card feeding and accumulating sections whereby the two may be disconnected so that the accumulators may be operated without accompanying functioning of the card feeding devices.

The printing mechanism is located at the right end of the machine and includes seven so-called banks of printing type bars. Below the accumulators is the plugboard of the machine by means of which the various units may be coordinated to produce the desired result in the form of a printed record. The tabulating motor, indicated at TM, serves to drive the card feeding devices, the accumulators, and the printing mechanism through suitable controlling mechanism, which will be described hereinafter.

Card feeding mechanism

Figure 2:
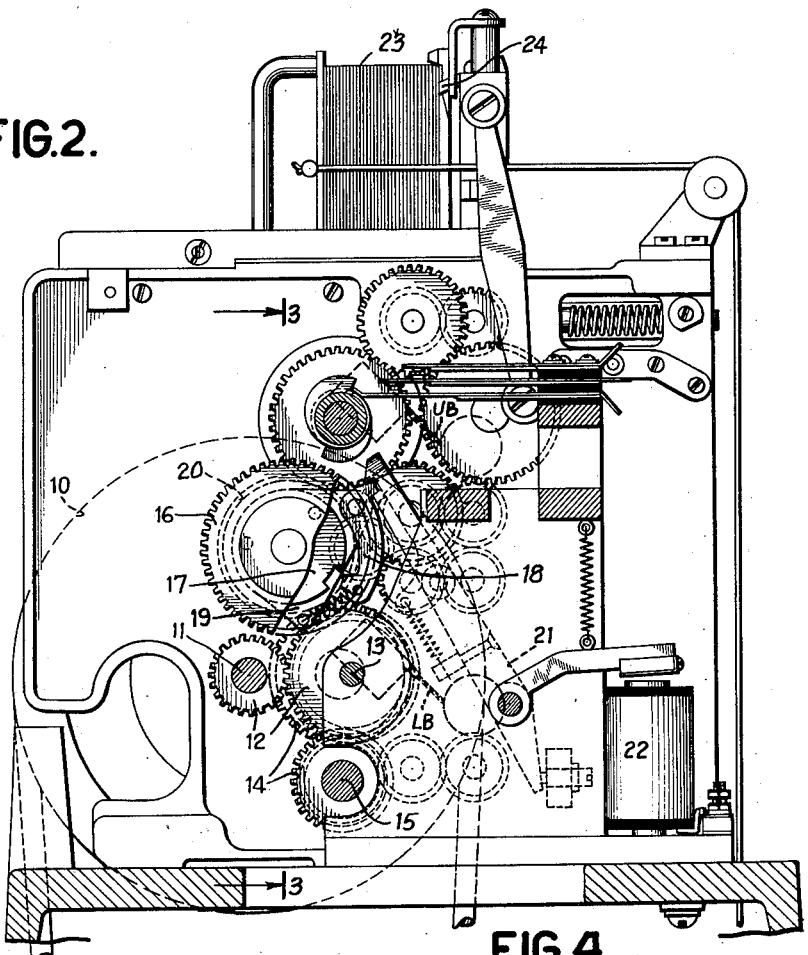
Fig. 2 is a section of the card feeding and analyzing mechanism showing the coupling connection therefor. The section is taken substantially along lines 2—2 of Fig. 1.
Figure 3:
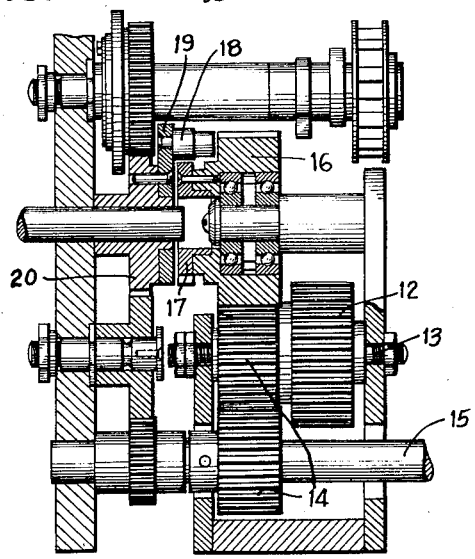
Fig. 3 is a detail in section taken substantially along lines 3—3 of Fig. 2.

The card feeding mechanism and its de-clutching device are shown in Figs. 2 and 3 where the pulley 10, driven from motor TM, has driving connection with shaft 11, which, through gears 12, drives a shaft 13. The latter is turn, through gears 14, drives the accumulator drive shaft 15. This shaft is in constant rotation as long as shaft 11 is driven by the motor. One of the gears 14 engages a gear 16 (Fig. 3) to which is secured a clutch driving element 17. Adapted to cooperate with element 17 is a spring-pressed dog 18 carried by a member 19 integral with a gear 20, which latter has connection to the usual train of gears which serve to convey the record cards through the analyzing devices. The dog 18 is normally held out of engagement with element 17 by a clutch releasing arm 21, which, upon energization of a magnet 22, is rocked in a clockwise direction to release dog 18 for engagement with element 17 so that the card feeding mechanism may operate. During its operation, the cards are fed singly from a stack 23 by means of a picker 24 to suitable rollers which convey the cards past upper analyzing brushes UB and lower analyzing brushes LB.

The brushes are so spaced that a record card feeds past the lower analyzing brushes LB exactly one machine cycle after it has passed beneath the upper analyzing brushes UB. It will be apparent that card feeding operations only take place when magnet 22 is energized to permit coupling of the card feeding mechanism to the driving mechanism.

Accumulators

Figure 4:
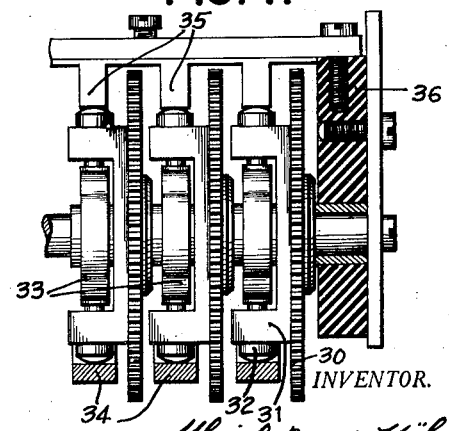
Fig. 4 is a detail of a portion of the read-out mechanism of an accumulator.
Figure 5:
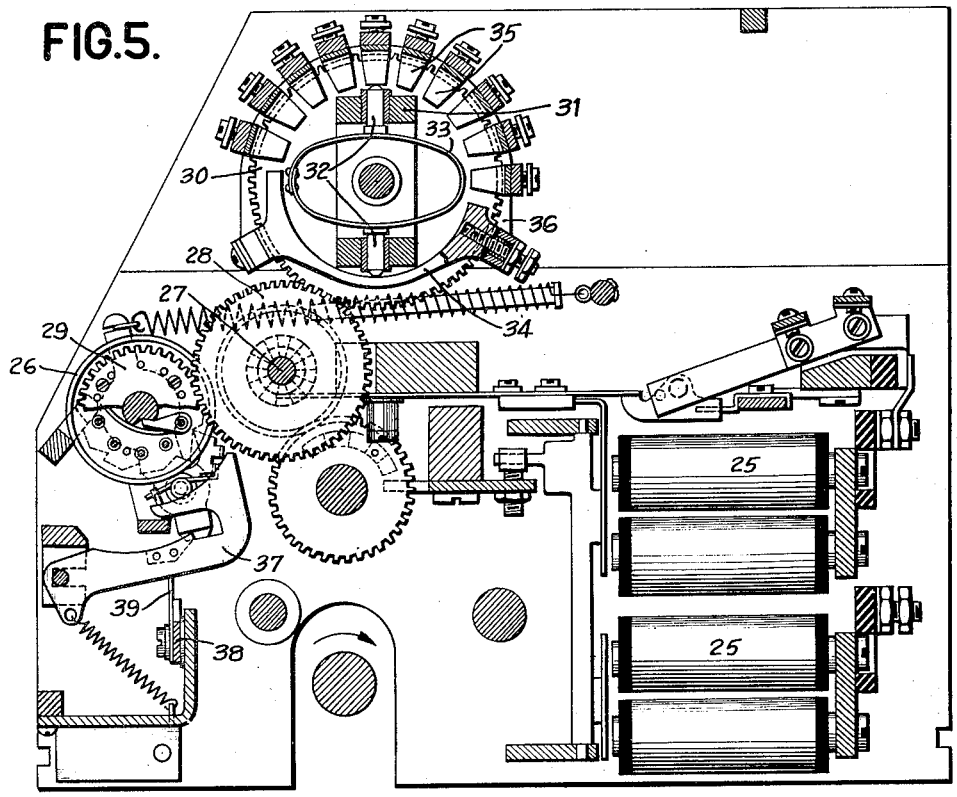
Fig. 5 is a central section of an accumulator showing the type of read-out mechanism associated therewith.

As the perforated cards pass the lower brushes LB perforations in their index points permit instantaneous closure of circuits through the proper lower analyzing brushes LB to energize accumulator magnets 25 (Fig. 5). As usual, the timed energizations of these magnets control mechanism for entering the data corresponding to the card reading on the wheels 26. The wheels 26 are driven from a clutch shaft 27 to which a gear 28 is coupled upon energization of magnet 25. Gear 28 has driving connection with wheel 26 through a gear 29 fast upon the wheel. Gear 28 also drives a gear 30 upon which is mounted a yoke 31 (see also Fig. 4). Slidably mounted on the yoke is a pair of contact plungers 32 urged outwardly by a looped leaf spring 33. One of the plungers 32 cooperates with an arcuate conductor 34 while the other plunger cooperates with a plurality of segments 35 which correspond in number and position to the several digit indicating positions of the wheel 26. The relationship between the several parts is such that the contact plungers 32 are angularly displaced according to the reading on the accumulator wheel. Thus, when the wheel is set to represent "5", one of the plungers 32 will be in contact with the "5" segment 35 and the other plunger will be in contact with the conductor 34.

Each group of segments 35 corresponding to the same digit constitutes a common bar of conducting material mounted at its ends upon a suitable insulating block 36.

Associated with each accumulator wheel is the usual carry lever 37 (Fig. 5) which controls carrying from its order to the next higher. As any wheel passes from "9" to "0" its lever 37 is rocked slightly clockwise and thereby conditions the next higher order to receive an additional unit during the carrying period of the machine cycle.

Figure 6:
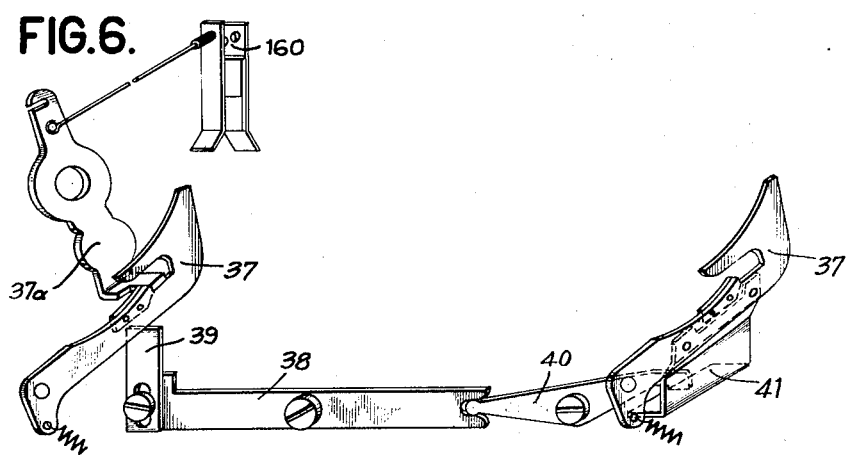
Fig. 6 is an isometric view showing the so-called highest order carry mechanism whereby an entry of "one" may be made into the units order under control of the highest order.

*Highest order carry mechanism.*—In Fig. 6 there is shown mechanism for connecting the highest order carry lever 37 with the lowest or units order carry lever in such manner that when the highest order wheel 26 passes from "9" to "0", the lowest order lever 37 will be rocked slightly clockwise and an additional unit will consequently be entered into such order. This mechanism comprises a lever 38 having an adjustable arm 39 at one end disposed in the path of the highest order lever 37. The opposite end of lever 38 has connection with an arm of a member 40, the other of whose arms engages an angle 41 secured to the units carry lever 37 so that as the arm 39 moves downwardly the angle 41 will be moved in the same direction to also draw the units lever 37 down. This carry lever controlling mechanism is contained in each of the eight accumulators and functions during subtracting operations of the machine as will be further explained hereinafter. Tripping of the highest order lever 37 when the wheel 26 passes from "9" to "0" will release its associated latch 37a so that the latter may rock in a clockwise direction and cause closure of a pair of contacts 180. These contacts function to condition the read-out circuits of the accumulator as will be explained.

Printing mechanism

Figure 7:
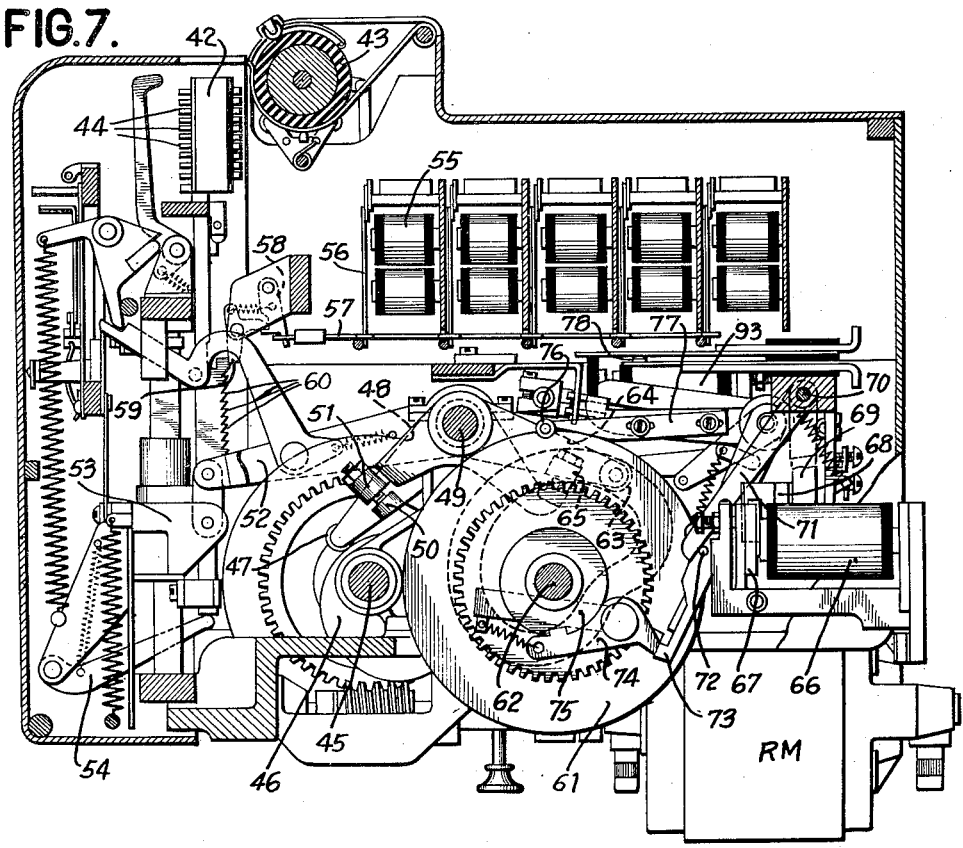
Fig. 7 is a central section of the printing mechanism showing the driving instrumentalities.

The printing mechanism is shown in Fig. 7 and is similar to that shown in the Daly and Page patent mentioned above. The type bar 42 is positioned relatively to the platen 43 to bring the proper type 44 into printing position opposite the platen. The "total" shaft 45 driven by the reset motor RM is provided with a cam 46 cooperating with a roller 47 carried on arm 48 which is freely rotatable on shaft 49. As the cam rotates, arm 48 rocks clockwise and a lug 50 on arm 48 cooperating with a double-armed member 51 fixed to shaft 49 also rocks the member clockwise. Arm 52 secured to shaft 49 is linked to printing crosshead 53 which serves to raise the type bars 42 in synchronism with the total taking operation so that the type 44 successively pass printing position opposite the platen. Owing to spring operated scissors connections 54, however, the type bars 42 may be arrested at any printing position without interfering with the upward movement of the crosshead 53. The type bars are arrested under control of the printing magnets 55. When any such magnet is energized it attracts its armature 56 and pulls a call wire 57 toward the right thereby releasing a latch member 58 normally holding a stop pawl 59. When the pawl 59 is so released, it is spring operated to engage ratchet teeth 60 formed on the type bar 42 to prevent further upward movement of the bar and thus hold a particular type 44 in printing position.

During listing operations, shaft 49 is rocked to reciprocate printing crosshead 53 under control of listing cam 61 carried by list shaft 62 which is operated from the motor TM through shaft 15 (Fig. 2) in the usual manner during listing and card feeding operations.

Cam 61 is provided with a cam slot which cooperates with follower rollers 63 carried by an arm 64 loosely mounted on shaft 49. A lug 65 on arm 64 cooperates with double-armed member 51 to rock shaft 49. The configuration of the cam groove is such that the type bars are elevated and the type 44 move past printing position in synchronism with the passage of the corresponding index point positions in the record cards past the analyzing brushes. Cam 61 is freely mounted on shaft 62 and may be coupled thereto under control of a magnet 66 which, upon energization, will rock its armature 67 which in turn through an extension 68 will rock an arm 69 carried by a rod 70. Rod 70 also carries an arm 71 whose free end is adapted to engage the pin 72 in clutch releasing arm 73 which normally engages a spring-pressed dog 74 integral with the cam 61. Rocking of arm 73 under the influence of magnet 66 will free dog 74 for engagement with clutch driving element 75 secured upon shaft 62 so that the cam 61 will move with the shaft. Magnet 66 is energized whenever listing operations are to be performed. The cam 61 is adapted to cooperate with a roller 76 in an arm 77 which is freely mounted on the supporting rod of arm 73 and will rock the arm clockwise to cause opening of a pair of contacts 78 whose function will be explained in connection with the circuit diagram.

The adding and printing mechanisms just described are well known in the art and only sufficient thereof has been explained for an understanding of the present invention.

Double step relay

Figure 8:
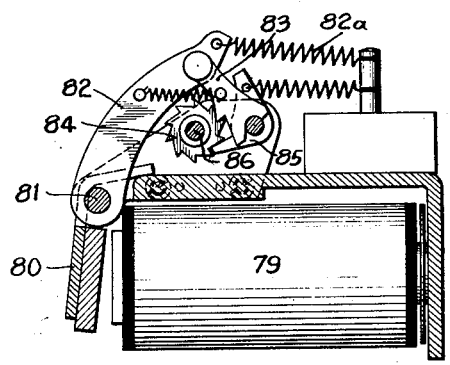
Fig. 8 is a detail of a so-called double step relay.
Figure 9:
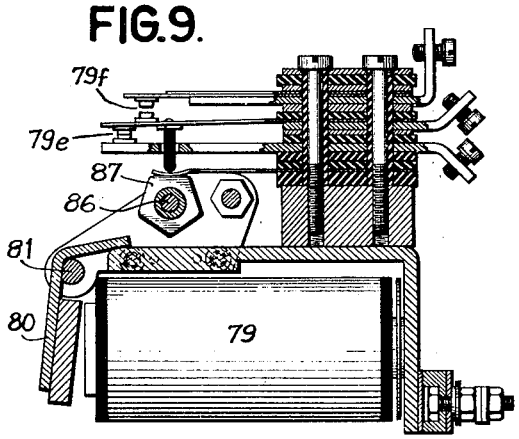
Fig. 9 is a further detail of the relay.

A double step relay is illustrated in Figs. 8 and 9 whose function is to control the reading out circuits of the accumulator for balance printing when subtracting operations are being performed. The relay comprises a magnet 79, which, upon energization, will rock its armature 80 secured to a pivoted rod 81. Rod 81 also carries an arm 82 at the free end of which is pivoted a pawl 83 spring-pressed into engagement with a ratchet 84 which has ten teeth. A spring-pressed pivoted member 85 serves as a detent to hold ratchet 84 in position. Rocking of rod 81 will elevate pawl 83 and upon deenergization of magnet 79, spring 82a will return member 85 to advance ratchet 84 one tooth. The ratchet is mounted upon a rod 86 which also carries a cam 87 of pentagonal outline. Cooperating with cam 87 are contacts 79e and 79f which are adapted to open and close respectively when the high points of the cam lie directly above rod 86. Since ratchet 84 has ten teeth and cam 87 has five low points and five high points, it is obvious that a single operation of magnet 79 will open contacts 79e and close contacts 79f and a second energization will permit them to resume the position they occupy in Fig. 9. The function of contacts 79e and 79f will be more fully explained in connection with the circuit diagram.

Lying behind cam 87 in Fig. 9 are additional and similar cams 87 each with a normally open pair of contacts 79a, 79b, and 79c (not shown in Fig. 9 but similar to contacts 79f). The first energization of magnet 79 will cause these contacts to close also and a second energization will reopen them. The manner in which they enter into the operation of the machine will be pointed out in connection with the explanation of the circuit diagram.

Wiring diagram—operating circuits

The various mechanical devices employed in the present invention have now been explained to show their manner of operation. The wiring diagram, which is about to be explained, will serve to show how the several elements are coordinated in the operation of the machine and it will be pointed out in connection with this explanation how various relationships may be obtained through the use of the plugboard of Fig. 10. The electric circuits are shown in Figs. 11, 11a, 11b, 11c, and 11d, which, taken together and placed one below the other in the order named, constitute a complete wiring diagram of the electric circuits of the machine.

In the circuit diagram relay magnets and their associated contacts have generally been shown in close proximity to one another and the related contacts have been designated with the same reference numeral as the controlling magnet with a lower case letter suffixed thereto. In certain instances, where it would add to the complexity of the circuit connections to show the relay magnets and their contacts together, the magnet has been shown in dotted outline adjacent to the contacts which it controls.

The various cam controlled contacts, as shown on the drawings, are suitably labelled to indicate the units with which they are associated. Thus, cam contacts prefixed "T" are those which operate when the card feeding mechanism functions. Contacts prefixed "L" and "ZL" function when the tabulating and listing mechanisms operate and those which operate only during total taking operations are prefixed with the letter "P" or "SP".

In order to facilitate the location of the various electrical devices on the circuit diagram, vertical broken lines are drawn at the sides thereof with spaced graduations, the spaces between which are serially numbered. In the following description the various elements will be located with reference to these numerals. For example, a cam contact, such as P1, will be designated as being located at (L3) on the circuit diagram. The designation L3 is interpreted as left of section 3. Elements in the center of the drawing will be designated as C for center followed by the appropriate numeral, and elements at the right will be designated as R.

*Initial resetting circuit.*—As is customary in tabulating machines of this type, an initial resetting cycle of operation is usually performed to ensure that all accumulators are zeroized and to prepare the usual automatic group control mechanism for proper functioning. Referring now to Fig. 11, after the main line switch has been closed, current will be supplied to the left side of line 90 and right side of line 91. Depression of the reset key at this time will close contacts 92 (C5) to establish a circuit traceable as follows: From left side of line 90, cam contacts L5 (L7), contacts P3, reset clutch magnet 93, relay magnet 94, relay contacts 95d, reset key contacts 92, switch S3c, switches S18a, S20a, contacts 97a, to line 91. The relay 94 closes its contacts 94a (C7) to complete the circuit through the reset motor RM. This circuit follows from line 90, contacts L5, motor RM, contacts 94a, to line 91, and the total shaft 45 (Fig. 7) consequently commences rotation during which cam contacts P4 (R7) are closed to short circuit the contacts 94a and maintain the motor circuit throughout the cycle.

Near the end of the cycle contacts P3 (L7) open to interrupt the reset clutch circuit. Also during this cycle the operation of cam contacts P5, P6, and P7 (L11—12) sets up the automatic control circuits which will be more fully explained later. The setting up of these circuits will effect energization of the so-called motor control relay magnet 97 (L12) to cause opening of contacts 97a (R4) and closure of contacts 97b. These contacts will thereafter remain in their shifted position until the group control mechanism detects a change in group control designations on successively analyzed record cards.

The machine may now commence card feeding operations and these may be initiated by depressing the start key to close contacts 98 (C3) whereupon a circuit will be completed as follows: from left side of line 90, cam contacts P1, (L3) clutch magnet 99, contacts 99a, relay coils 100, 95, a pair of stop key contacts 101, start key contacts 98, a second pair of stop key contacts 102, relay contacts 103a, contacts 97b (now closed), to line 91. Energization of clutch magnet 99 will cause opening of related contacts 99a and consequently relay magnet 104 will be included in the circuit. This relay will close its contacts 104a (C2) thereby completing a circuit through the tabulating motor TM. The energization of clutch magnet 99 will cause operation of the accumulating mechanism and energization of the printing clutch magnet 66 (C4) will cause accompanying operation of the printing mechanism.

*Printing clutch circuit.*—The circuit for magnet 66 is traceable from line 90, magnet 66 (C4), upper contacts P11, relay contacts 105a (closed when the machine is set for listing operations), contacts 97c (closed during the initial resetting cycle by magnet 97), to line 91. With the magnet 66 energized, printing operations will take place during each cycle of operations of the machine.

The contacts 105a are controlled by relay magnet 105 (R1) which is energized upon manual closure of contacts 106. These contacts are closed when the machine is conditioned for listing and consequently magnet 105 will remain energized throughout such operations.

Relay magnet 95 (C3), energized upon completion of the circuit through clutch magnet 99, will close its contacts 95a to transfer the circuit through the clutch magnet to the control of cam contacts L2 which hold the circuit throughout the cycle. A second pair of contacts 95c (L1) are closed by the relay to complete a circuit, under control of cam contacts L1, to a relay 107. This relay will close its contacts 107a and open its contacts 107b and thereby serves to control the speed of the motor TM. Contacts 107b, when closed, short circuit a resistance 108 in the field circuit of the motor TM and opening of these contacts will include the resistance in the field circuit so that the speed of the motor will thereby be increased. A second pair of contacts 105b (R2) also short circuits resistance 108 and these contacts are closed along with contacts 105a when the machine is set for listing. Contacts 78 in series with 105b close mechanically when the printing clutch is engaged and open when it is disengaged. This serves to cause high speed operation during transfer cycles during which there are no printing operations.

*Card lever circuits.*—As the record cards feed downwardly past the analyzing brushes UB the card lever contacts 109 (R12) close to energize relay magnet UCL whose contacts UCLa form a holding circuit through cam contacts L13. Another pair of contacts UCLb (C3) in the circuit of clutch magnet 99 short circuits cam contacts L2 and L3 to maintain the motor circuit when these cam contacts open momentarily during the cycle. As the card passes the lower analyzing brushes LB, lower card lever contacts 110 (R12) are closed to energize lower card lever relay LCL whose contacts LCLa provide a holding circuit through cam contacts L14. Relay LCL controls several contacts which will be explained in connection with the circuits which they control.

*Card feed clutch circuit.*—For card feeding operations, the switch S3a (L4) is closed and a circuit completed from line 90, through card feed clutch magnet 22 (L4), switch S3a, to line 91. The magnet 22 will therefore remain energized throughout all machine operations and the card feeding mechanism will operate accordingly.

Under control of the circuits thus far described the machine will operate to feed cards successively through the analyzing mechanism and circuits will be completed through perforations in the records for controlling the operation of the accumulating and printing magnets. The detail tracing of the accumulating and printing circuits will be deferred until later in the description. During the feeding of the cards, the automatic control mechanism, generally designated GC in (C11), functions to keep the machine running as long as successive cards contain the same group control number.

Upon detection by this mechanism of a change in group control designation, the relay magnet 97 (L12) will become deenergized, causing opening of the related contacts 97b (R4) to interrupt the circuit through main clutch magnet 99, which in turn will break the circuit to the motor TM and card feeding and accumulating operations will thereupon cease.

*Automatic resetting circuits.*—If switch S2 (R6) is closed, the closure of cam contacts L6 toward the end of the last adding cycle when contacts 97a are closed will complete a circuit to initiate automatic resetting operations. This circuit is traceable from line 90, contacts L5, P3 (L7), reset clutch magnet 93, relay magnet 94, contacts 95d, switch S2, contacts L6, switch S3c, switches S18a, S20a, contacts 97a, to line 91. Energization of magnet 93 will cause a resetting cycle of operations of the machine during which the amounts standing in the accumulators will be printed and the group control devices again set up to open contacts 97a.

*Automatic restarting circuit.*—Following the reset cycle the machine may automatically enter upon card feeding and analyzing operations, if switch S1 (C4) is closed. Under such condition the closure of cam contacts P2 near the end of the reset cycle will complete the circuit to the main clutch magnet 99 through the following path: from line 90, contacts P1 (L3), magnets 99, 104, 100, and 95, stop key contacts 101, switch S1, contacts P2, contacts LCLc (closed if there is a card at the lower brushes), contacts 103a, contacts 97b, to line 91. The energization of magnet 99 will, as explained above, cause the machine to enter upon a tabulating cycle of operations during which the succeeding record cards are analyzed and the data thereon entered into the recording devices.

*Automatic control circuits.*—The automatic group control circuits which keep the machine in operation as long as classification data on successively analyzed cards are the same will now be explained in detail.

Figure 11A:
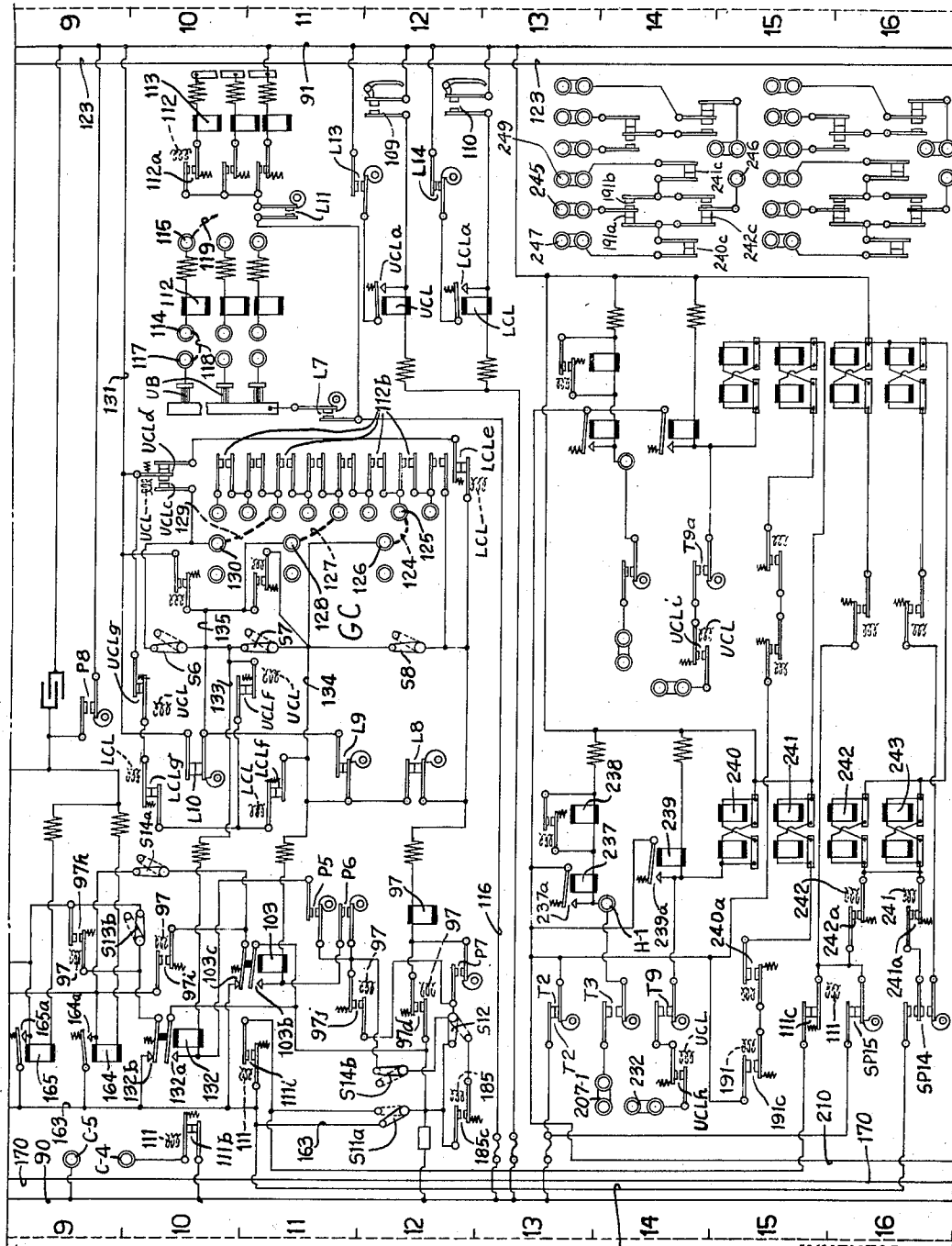

A number of double-wound relay magnets are provided each having a pick-up winding 112 (R10) and a holding winding 113 shown separately in Fig. 11a. Windings 112 terminate in the plugboard sockets 114 and 115 through which the windings may be plug connected in series with the brushes UB and LB. Since the index point positions on the card passing the lower brushes are analyzed concurrently with the analysis of the corresponding index point positions of the following card passing the upper brushes, a perforation occurring in any index point position of both cards will complete a circuit at a time in the cycle of the machine corresponding to the location of the perforation. This circuit is traceable as follows: from line 90, through wire 116 (L13), cam contacts L7, upper brush contact roller, brush UB, plug socket 117, plug connection 118 to socket 114, winding 112, socket 115, plug connection 119, to lower brush socket 120 (R31) (see also plugboard Fig. 10), lower brush LB, wire 121, impulse distributor 122 (R25), wire 123, lower card lever relay contacts LCLd (R4), contacts 103a and 97b, to line 91. On the plugboard (Fig. 10) a representative connection is made for controlling on column 4. Energization of winding 112 will close its related contacts 112a and 112b (C10), the former setting up a holding circuit for the winding 113 which is traceable from line 91 (R11), through winding 113, contacts 112a, cam contacts L11 to line 90 through wire 116. Contacts L11 hold the windings 113 energized until the end of the cycle and until the mechanism has performed its controlling functions.

It is thus apparent that the windings 112 are differentially energized in accordance with the value of the controlling perforation and that the windings 113 hold all the selected circuits to keep contacts 112b closed in positions in which agreement occurred between the cards. In the machine there are provided sixteen sets of windings 112, 113. On the circuit diagram, however, only three are shown to avoid undue repetition of similar parts.

After all the index point positions have been analyzed, the machine tests the setting of the contacts 112b. If there was agreement in all the control columns, the contacts 112b corresponding to those columns will be closed and a series circuit will be traceable through each such contact. The contacts associated with the so-called "minor" controlling field of the record card will be grouped together and a connection 124 (C12) made between the plug socket 125 of the last position and "minor" plug socket 126. This places the first two contacts 112b (C12) in the minor holding circuit. A plug connection 127 made between another plug socket 125 and a socket 128 will place the next two contacts 112b in the intermediate holding circuit and a plug connection 129 made to a socket 130 will place the fifth and sixth contacts 112b in the major holding circuit. The ultimate object of the group control mechanism is to keep the motor control 97 energized, if there is agreement in the minor, intermediate and major control fields and to cause deenergization of magnet 97, if there is a break or disagreement in any of these fields.

*Minor holding circuit.*—Magnet 97 is normally held energized through a circuit set up during the initial reset cycle of the machine. During this cycle, cam contacts P7 close completing a circuit from line 90, switch S12 (L12), contacts P7, magnet 97, contacts L8, L9 (C12), contacts L10, wire 131, to line 91. Magnet 97 closes a pair of contacts 97d (L12) to establish a holding circuit through the magnet. This circuit is called the minor holding circuit and remains established as long as minor classification data on the record cards do not change.

*Intermediate holding circuit.*—Concurrently with the setting up of the minor holding circuit the intermediate holding circuit is also completed upon closure of cam contacts P6 provided switch S14b (L12) is closed. This circuit is traceable from line 90, switch S12, switch S14b, cam contacts P6, intermediate control relay 103, contacts L9, L10 to line 91 through wire 131. Magnet 103 will close contacts 103b to provide a holding circuit which is called the intermediate holding circuit which remains energized as long as intermediate classification data do not change.

*Major holding circuit.*—In a similar manner the major holding circuit is established upon closure of cam contacts P5. This circuit is traceable from line 90 (L12), switches S12, S14b, contacts P5, major control relay 132, wire 133, contacts L10, to line 91. Relay 132 will close its contacts 132a to provide a holding circuit for the relay which is known as the major holding circuit and this remains energized as long as major classification data do not change.

If there is a change in the minor group number, the minor holding circuit alone is broken. If there is a change in an intermediate group number, both the minor and the intermediate group circuits are broken, and if there is a change in the major group number, the minor and intermediate circuits are also broken. This provides against the possibility of the major number changing and the intermediate and minor group numbers remaining the same, which would preserve the control circuit to magnet 97.

During each cycle of the machine, cam contacts L8, L9, and L10 (C12) open momentarily. Since these contacts are in the minor, intermediate, and major holding circuits respectively, these circuits would be interrupted at this time, if no other path were provided around the contacts.

*Minor shunt circuit.*—During tabulating and listing cycles of the machine the contacts 112b provide a shunt circuit around contacts L8, L9 and L10. For example, the first six contacts 112b, when all are closed and when plug connection 124 is made as shown, short circuit contacts L8, L9 and L10, the short circuit running from line 90, contacts 97d (L12), magnet 97 to the lowermost contacts 112b, then to the upper blade of the sixth pair, plug connection 129, contacts UCLc, wire 131, to line 91.

*Intermediate shunt circuit.*—The intermediate shunt circuit comprises the four contacts 112b associated with both the major and intermediate controlling fields of the card and short circuits contacts L9 and L10, the short circuit extending from the lower blade of contacts L9, wire 134, serially through the contacts 112b, 3 to 6, plug connection 129, contacts UCLc, wire 131, to line 91. Thus, if at the time contacts L9 and L10 open and the control relays have registered agreement between the two cards analyzed the intermediate holding circuit will be sustained through the four contacts 112b, 3 to 6.

*Major shunt circuit.*—The major shunt circuit comprises two uppermost pair of contacts 112b used for controlling and short circuits the contacts L10, the short circuit extending from lower blade of contacts L10 through the upper two pairs of contacts 112b, plug connection 129, relay contacts UCLc which are closed while cards are passing the upper brushes, to wire 131, and line 91.

Thus, if at the time contacts L8, L9, and L10 open and the control relays have registered agreement, the three holding circuits will be sustained through the contacts 112b. If at such time one of the two lowest contacts 112b failed to close, the minor holding circuit would have been broken, deenergizing relay magnet 97, causing stoppage of the machine or automatic entry upon a total taking and resetting cycle. If either of the contacts 112b in the intermediate pair had failed to close, both the intermediate and minor holding circuits would have failed to remain energized and the intermediate control relay 103 would also have been deenergized and similarly, if either of the major contacts had failed to close, the major control relay 132 would in addition have been deenergized.

*Control setup circuits.*—During the subsequent total taking cycles, closure of cam contacts P5, P6, and P7 will again establish the several holding circuits and comparison of the successively fed records of the next group will take place and card feeding will proceed until there is again a break in one of the circuits. Switches S6, S7, and S8 are provided (C10, C11) which, when in their closed or full line positions, permanently short circuit the contacts L10, L9, and L8 respectively, to render the related sections of the control inoperative. If all are closed, the holding circuits remain established indefinitely.

Several card lever relay contacts are included in the control holding circuits to maintain them at the beginning of the tabulating machine operations until cards have been advanced to the analyzing brushes. Thus, card lever relay contacts UCLd (C10) and LCLe are normally closed and connected in series so as to short circuit all the contacts 112b. This short circuit will be maintained until a card is at the upper brushes when contacts UCLd are opened. Also, relay contacts LCLf and UCLf (C11) maintain the intermediate holding circuit until cards are at the two sets of brushes and contacts LCLg and UCLg (C10) perform a similar function.

The machine is arranged so that the three holding circuits may be set up concurrently and the machine will perform a single reset cycle or the machine may perform two reset cycles during the first of which only the minor relay is set up and during the second the intermediate and major relays are concurrently set up. For the single reset cycle condition, switch S14b (L12) is closed so that a circuit is completed therethrough to the cam contacts P5 and P6 during the same cycle through circuits which have been traced above in connection with the several control holding circuits. For successive reset operations the switch S14b is moved to its open or dotted line position so that during the first reset cycle only relay 97 will be energized through switch S12 and cam contacts P7. The contacts P5 and P6 which control the setting up of the intermediate and major relays are timed to close and again open before contacts P7 close and in series with contacts P5 and P6 are relay contacts 97j, which close upon energization of relay 97 after P5 and P6 have opened.

The closing of contacts 97b (R4), due to the setting up of a minor control circuit, will not complete the tabulating motor circuit since in series with contacts 97b are contacts 103a which are still open due to the non-completion of the intermediate control circuit. At 7L is a switch S13a which is closed for the successive reset operations. This switch is connected through a normally closed switch S9b with contacts 103f which are closed at this time so that opening of cam contacts P3 during the first reset cycle will not interrupt the reset clutch circuit since contacts 103f and switches S9b and S13a short circuit the contacts and initiate a second reset cycle.

During this cycle the intermediate and major control relays 103 and 132 are set up through a circuit extending from line 90 (L12), switch S12, contacts 97j, now closed, thence in parallel through contacts P5 and P6 and control relay magnets 132 and 103. Energization of magnet 103 will close its contacts 103a (R4) to re-establish the tabulating motor circuit and contacts 103f (L7) will be open so that the reset clutch magnet circuit may be interrupted during the second reset cycle upon opening of contacts P3.

*Zero button magnet circuits.*—In Fig. 1 are shown the so-called zero button magnets 157 of which there is one for each accumulator. These magnets in the usual manner, when energized, couple the accumulators to the reset mechanism for resetting or zeroizing of the accumulators. These magnets are shown in the circuit diagram in Fig. 11 at C8 where each is wired to a plug socket E—1, E—2, etc., for individual selection. These sockets may be suitably plug connected to one of a trio of sockets C—1, C—2, or C—3 (L8) by suitable plug connections such as 161, Fig. 10.

In the upper right hand section of the plugboard (Fig. 10) are vertical columns of plug sockets labelled A—X and the horizontal rows formed by these columns are numbered 1—8. For convenience in referring to particular sockets they will be referred to and designated by the ordinates A—X and 1—8. For example, the socket E—1 is the first socket in column E; C—2 is the second socket in column C, and so on.

Connection to the socket C—1 will condition the selected accumulator for resetting upon a minor group change. Connection to the middle socket C—2 will cause resetting on an intermediate change and connection to the lowest C—3 socket will condition the selected accumulator for resetting on a major change. The connection 161, such as in Fig. 10, will select the accumulator for resetting on a minor change. If more than one accumulator is to be affected, series plug connections 162 may be made between sockets E—1, E—2, etc. Thus, for the plugging example shown, the accumulators associated with the three upper sockets E—1, E—2, and E—3 will be reset upon a minor group change.

*Single cycle resetting.*—When the machine is conditioned for concurrent resetting, all connected zero button magnets 157 will be energized during the single reset cycle, if there has been a major group change, deenergizing relays 132, 103 and 97. This is brought about as follows: A circuit is completed from line 90 (L12), through switch S11a, wire 163, to minor socket C—1 and thence through plug connection to socket E—1, zero button magnet 157, cam contacts P8, to right side of line 91. A parallel circuit will be completed from switch S11a through contacts 103c (L11), switch S14a, relay magnet 164, cam contacts P8, to line 91. Magnet 164 will close its contacts 164a to provide a holding circuit from switch S11a, wire 163, contacts 164a, magnet 164, contacts P8, to line 91. This circuit will also branch at contacts 164a to intermediate plug socket C—2 and thence through the associated zero button magnet 157 to line as before. Similarly, a relay magnet 165 associated with the major control is energized through a circuit extending from switch S11a, wire 163, contacts 132b, switch S13b, relay magnet 165, contacts P8, to line 91. Closure of contacts 165a will provide a holding circuit and will also provide a branch circuit to major socket C—3 which is completed through the appropriate zero button magnet 157.

It will be apparent that when only a minor group change occurs contacts 103c and 132b are open so that the intermediate and major accumulators are not reset. Also if there is but an intermediate group change, contacts 132b are open, thus permitting resetting of the minor and intermediate accumulators only.

*Double resetting.*—When the machine is conditioned for successive reset operations switches S13b and S14a (L10) are moved to open or dotted line position so that the circuits to relay magnets 165 and 164 will not be completed through these switches. In parallel with switch S13b are relay contacts 97h and in parallel with switch S14a are relay contacts 97i. These contacts are controlled by the minor control relay magnet 97 which, it will be recalled, is set up near the end of the first reset cycle. Upon closure of the contacts, the relays 164 and 165 will be set up through the circuits already traced so that the zero button magnets associated with the intermediate and major groups will be in condition for resetting during the second reset cycle of operations.

For double resetting operations, switch S13a (L6) is also closed so that the switch S13a together with switch S9b and minor relay contacts 103f short circuit contacts P3 which when they open fail to deenergize the reset circuit. During the second reset cycle, the intermediate control relay magnet 103 is energized, and contacts 103f opened thereby so that now upon opening of contacts P3 the reset circuit will be interrupted.

Thus far it has been shown how the automatic starting, automatic resetting, and machine operating circuits are controlled and how the automatic control mechanism functions to keep the machine running. For certain classes of work it is desired to have the machine, upon a change in group classification data, enter upon one or more so-called total transfer cycles of operation and to suspend total taking and resetting operations until these transfer cycles have been completed. The manner in which these transfer operations are initiated and carried out will now be explained.

*Transfer cycle controlling circuits*

Referring now to Fig. 11, the switch S3a (L4) is moved to its dotted line position when total transferring operations are to be performed. In this position the card feed clutch magnet 22 is connected in series with a pair of relay contacts 136a and cam contacts L4. In parallel with contacts L4 are switches S17a, S19a and minor control relay contacts 97e. The contacts 136a are closed during a total transferring cycle in a manner to be explained and during a following reset cycle, as will be pointed out, the contacts 97e are also closed. This sets up a circuit for relay magnet 137 which follows from line 90, relay magnet 137, contacts 136a, switches S17a, S19a, contacts 97e to line 91. Relay 137 closes its contacts 137a which provide a holding circuit for the relay and at the same time short circuit contacts 136a so that they may thereafter open. In this manner, a circuit is provided for the card feed clutch magnet 22 which is maintained until the group control mechanism causes opening of contacts 97e. This will break the card feed clutch circuit and the machine will perform total transfer cycles without accompanying card feeding.

Switch S3b (R3) is also moved to its closed position to provide a holding circuit for the main drive clutch magnet 99 after card feeding operations have been interrupted. This circuit is traceable upon closing of contacts 97a (R4) upon a group change as follows: from right side of line 91, contacts 97a, switches S17b, S19b, contacts 136b, switch S3b (now closed), switch S9d, contacts 95a (C3), relays 95, 106, and 104, clutch magnet 99, contacts P1, to line 90. At the completion of the total transferring operations, contacts 136b open to interrupt the circuit.

Switch S3c (R5) is open for total transferring operations so that automatic reset operations do not take place when the minor control relay contacts 97a close. The machine will now perform a succession of cycles of operation without accompanying card feeding or printing and as the machine is arranged, these extra cycles may be one, two, or three in number.

*First transfer cycle.*—With switch S4 (R17) closed, a circuit will be completed upon deenergization of the minor control relay 97 which is traceable from line 91, switch S4, contacts SP10, switches S18b, S20b, relay contacts 97g, now closed, switch S10b, cam contacts L15, relay magnet 138, wire 139, to line 90. Magnet 138 closes its contacts 138a to provide a holding circuit for the relay magnet. A parallel circuit is also traceable from contacts L15 through a magnet 140. This magnet controls the circuits through which transferring is effected fom one accumulator to another. These circuits will be more specifically dealt with hereinafter.

*Second transfer cycle.*—Near the end of the first transfer cycle, cam contacts ZL10 (C18) which close and open again slightly before contacts L15 close during the first transfer cycle, complete a circuit from contacts 97g, contacts 138a (now closed), through contacts ZL10, relay magnet 141, wire 139, to line 90. Contacts 141a provide a holding circuit which extends through contacts 138a so that at the completion of the second transfer cycle both relays 138 and 141 will be energized.

*Third transfer cycle.*—Near the end of the second transfer cycle, a pair of contacts ZL11 (C20) will close to complete a circuit from contacts 97g and 138a, through contacts ZL11, relay contacts 141b (now closed), relay magnet 142, wire 139, to line 90. Magnet 142 will close contacts 142a to provide a holding circuit for the magnet. Near the end of the third transfer cycle, cam contacts ZL12 (C21) will close and complete a circuit from contacts 138a, contacts ZL12, relay contacts 142b and 141c (now closed), relay magnet 136, wire 139, to line 90.

Relay magnet 136 functions to terminate the transfer cycles of operation and initiate an automatic total taking and resetting cycle and at the same time causes recoupling of the card feeding mechanism to the main drive mechanism of the machine. Energization of magnet 136 causes opening of a pair of contacts 136b (R3) which are in the main clutch magnet circuit traced above, so that the circuits to the tabulating motor TM will be interrupted. The contacts 136c (R4) will close and permit initiation of the automatic total taking and resetting cycle as previously explained.

A third set of contacts 136a (L4) will close to complete the circuit through card feed clutch magnet 22 and relay magnet 137, which latter provides a holding circuit for the clutch magnet so that upon automatic resumption of the card feeding and accumulating operations which follow the total taking cycle, the card feed mechanism will be already in operating condition. During the total taking cycle, cam contacts SP10 (R17) will open momentarily to deenergize the several relays 138, 141, 142 and 136 and the circuits which they control will return to normal condition. If switches S15 (C19) and S16 (C20) are closed, the machine will perform only one transfer cycle since these switches short circuit their respective cam contacts ZL10 and ZL11 so that the three relays 138, 141 and 142 will be energized at the same time and cause energization of magnet 136 at the completion of the single transfer cycle. If switch S15 is closed but switch S16 is open, the machine will perform two transfer cycles of operation, and if both are open, three cycles will take place in the manner just explained in detail.

The transfer cycle controlling devices are arranged to be responsive to any of the several group changes; that is, transfer cycles may be initiated upon either a minor, intermediate, or major group change. With switch S18b (R18) open, the circuit will be completed upon a major group change when contacts 132h close and will not be responsive to intermediate and minor changes. With switch S20b open, an intermediate group change, which causes closure of contacts 103g, will initiate the transfer cycles and a minor group change alone will have no effect. With both these switches closed, the mechanism will be responsive to all group changes.

When the machine is conditioned to perform transfer cycles of operation, the initial starting is by means of the start key and the machine will perform one, two or three preliminary transferring cycles followed by a reset cycle before feeding cards. The circuits involved are as follows:

Upon depression of the start key a circuit is completed from line 90, contacts P1 (L3), magnets 99, 104, 100, 95, contacts 101, lower start key contacts 98, contacts LCL*h*, wire 158, switch S3*b* (now closed), contacts 136*b*, switches S19*b*, S17*b*, contacts 97*a* to line 91. A machine cycle thereupon ensues without accompanying card feeding and since minor control relay contacts 97*g* (C17) are closed, the transfer cycle controlling circuits just traced will be set up. After one, two or three cycles, relay 136 will be energized to permit operation of the card feed clutch magnet and initiation of a reset cycle of operations during which the group control circuits are re-established as already explained.

The description thus far has pointed out how the motor operating circuits of the machine are controlled through the several types of cycles. The manner in which the data are read from the record cards and entered into the accumulating and printing devices and the manner in which transferring of data from one accumulator to another is effected during transfer cycles will now be explained.

*Adding and printing circuits*

The adding magnets 25 (C34, C35, C36) are wired to plug sockets 143 from which plug connection may be made to the lower brush sockets 120 (see Fig. 10) where representative plug connections 144 are shown between lower brush in columns 65—67 and the three lowest orders of ACC.VI. The adding circuit may be traced therethrough as follows: from line 90, (Fig. 11*d*) to contacts 25*a* (C33), adding magnet 25, plug socket 143 (Fig. 10), connection 144, socket 120 (R32), lower brush LB, impulse distributors 122 (R25), wire 123, lower card lever contacts LCL*d*, contacts 103*a*, contacts 97*b*, to line 91.

The print magnets 55 (L33) are wired to plug sockets 147 through relay contacts 145*a* which are adapted to be closed during listing operations.
A plug connection is made between sockets 147 and lower brush socket 120 in positions in which printing is to be effected. Representative plug connections are shown in Fig. 10 at 146 between lower brush positions 74—76 and print bank 3.
The printing circuit may then be traced from lower brushes (R32), socket 120 (Fig. 10), connection 146, socket 147 (C33), contacts 145*a*, print magnet 55, to line 90. In this manner the adding magnet 25 and the corresponding printing magnet 55 are concurrently energized through the circuits traced and the number represented by the location of the perforation will be entered into the adding mechanism and printed under control of the printing mechanism.

*Total printing circuits.*—During total taking operations the printing magnets 55 are connected to plug sockets 148 (C33) through relay contacts 149*a* which are closed during total taking operations in a manner to be set forth. The sockets 148 may be connected to sockets 150 (R33) of the accumulator read-out mechanism. The location of these sockets is shown on the plug-board (Fig. 10) where representative plug connections 151 are shown for Acc. VI. During the total taking cycle, circuits will be completed through the read-out devices of the accumulator at differential times according to the position of the contact wipers 32 (R33) through circuits of which the following is representative: from line 91 (Fig. 11*c*) through wire 152 (R25), cam contacts SP12, wire 153, a series of cam contacts SP1–SP9, which close in succession to emit impulses to wires 154.

These wires extend through cable 155 and terminate in contacts 156*a* (R34). Contacts 156*a* are normally closed and connect the bars 35 of the read-out device to the appropriate emitting contacts SP1 to SP9.

Assuming now that a wiper 32 is positioned to represent "8", the total printing circuit will follow through the SP8 contact timed to close at the "8" time in the cycle and thence through the "8" wire 154 to the "8" contact 156*a* to bar 35 and thence through wiper 32 to bar 23, plug socket 150 (Fig. 10), connection 151, to socket 148 (C33), contacts 149*a*, print magnet 55, to line 90.

*List selection.*—It will be recalled that in tracing the listing circuits it was pointed out that relay contacts 145*a* (C33) would first have to be closed before such circuits could be completed. The manner in which the controlling relay 145 is energized to cause such closure of the contacts will now be explained. These relays are shown at L30 and terminate in plug sockets B—1 to B—7, one for each printing bank. From sockets B—1 to B—7 a plug connection may be made to a plug socket A—1 (C28) through a connection 168 (Fig. 10). With this connection, a circuit is completed every cycle of the machine, which circuit extends from line 90 cam contacts L19 (L25), lower list contacts 169, which are manually positioned as shown for listing operations, plug socket A—1, plug connection 168, socket B—1, relay magnet 145, relay contacts 140*f* (L28) whose controlling coil 140 is energized during transfer cycles as explained, wire 170 (Figs. 11*b*, 11*a*, and 11), contacts 104*a* (C2) to line 91. In this manner the contacts 145*a* in the listing circuits are closed during each cycle of the machine.

*Group indicating on minor change.*—When it is desired to print designating data from the first card of each minor group only, a plug connection 172 is made from sockets B—1 to B—7 to plug socket A—2 (C25). The circuit to relay magnet 145 is then traceable from line 90, cam contacts L19, relay contacts 173*a*, closed in the manner to be explained, contacts 173*b*, plug socket A—2, connection 172, socket B—2, magnet 145, to line as before. Relay magnet 173 is energized during each reset cycle through a circuit extending from line 90, cam contacts L19, cam contacts SP11, relay magnet 173, to line 91. Energization of relay 173 closes its contacts 173*a* and 173*b*, the former providing a holding circuit therefor, through cam contacts L19 which circuit is maintained throughout the first listing cycle following the reset cycle. At the end of this cycle, cam contacts L19 open momentarily to drop the holding circuit and consequently cause de-energization of the relay magnet 145 connected with socket A—2 so that no listing circuits can be completed through such bank after the first listing cycle.

*Group indicating on intermediate change.*—If group indicating is desired after an intermediate change, a connection similar to 168 and 172 is made to a socket A—3 and if indicating is desired only after a major group change, the connection is made to a socket A—4. Associated with socket A—3 is a relay 176 which will be energized during the reset cycle, if there has been an intermediate group change, in which event, contacts 103h (L27) will have closed permitting the completion of a circuit from line 90, contacts L19, SP11, 103h, magnet 176, to line 91. Magnet 176 will close its contacts 176a and 176b, the former to provide a holding circuit and the latter to connect socket A—3 to one side of the line.

*Group indicating on major change.*—Similarly, a relay 177 is associated with the major socket A—4 and during the reset cycle, if the major control relay has been deenergized, the closure of contacts 132g (L27) will permit energization of relay magnet 177 causing closure of its contacts 177a and 177b. In this manner the seven printing banks of the machine may be selectively connected to print group indicating data upon any group change.

When the machine is conditioned for tabulating operations, the contacts 169 (L28) are shifted so that the upper pair remain closed. Relays 145 which are connected to socket A—1 will therefore be energized after each resetting cycle through a circuit from line 90, contacts L19, 173a (closed after each reset cycle), upper contacts 169, plug socket A—1, connection 168, socket B—1, relay magnet 145, to line 91, as before.

In Example I following is shown a record on which selective group indicating is effected with the machine listing each item. In Example II the same record is shown as prepared with the machine operating under tabulating or non-listing conditions.

*Example I*

| Group indication | | | Total printing | | |
|---|---|---|---|---|---|
| Min. | Int. | Maj. | Min. | Int. | Maj. |
| 21 | 6 | 34 | 18 | | |
| | | | 6 | | |
| | | | 4 | | |
| | | | 28* | | |
| 22 | | | 14 | | |
| | | | 11 | | |
| | | | 7 | | |
| | | | 32* | 60* | |
| 23 | 7 | | 6 | | |
| | | | 15 | | |
| | | | 12 | | |
| | | | 33* | | |
| 24 | | | 17 | | |
| | | | 14 | | |
| | | | 72 | | |
| | | | 43* | 76* | 136* |
| 25 | 8 | 35 | 5 | | |

*Example II*

| Group indication | | | Total printing | | |
|---|---|---|---|---|---|
| Min. | Int. | Maj. | Min. | Int. | Maj. |
| 21 | 6 | 34 | 28* | | |
| 22 | | | 32* | | |
| 23 | 7 | | 33* | 60* | |
| 24 | | | 43* | 76* | 136* |
| 25 | 8 | 35 | | | |

In the examples, under the heading "Group indications", are listed the three group control numbers. Under the heading "Total printing" are listed the three positions in which total printing is effected from three related accumulators, it being understood that the same entry is made into each accumulator from each record card but that printing is only effected in the one associated with the minor group. As shown, three items 18, 6, and 4 are successively entered into the accumulators, following which a change in minor group number initiates a total printing cycle of operations during which the total 28 followed by an asterisk is printed and the minor accumulator cleared. During the first cycle of the next card group, only the new minor group number is printed and individual items are successively recorded and accumulated. After the entry of the second group an intermediate group change occurred followed by the printing of the minor and intermediate group totals 32 and 60. On the next listing cycle, the new minor and intermediate group numbers are printed and further accumulating effected. Upon a major group change the three totals are printed, namely, 43, 76, and 136, and such printing is followed on the next cycle by the printing or indicating of new minor, intermediate and major group numbers. In Example II only the group indications and totals are printed. The individual items are not listed and paper spacing is effected only during total printing operations.

*Total print selecting circuits*

The manner in which the relay contacts 149a are closed to control the total printing circuits will now be described.

Each group of contacts associated with a printing bank is controlled by a relay magnet 149 (R22) each of which is connected to a plug socket D—1 to D—7 through relay contacts 179a. From sockets D—1 to D—7 a plug connection 180 (see Fig. 10) may be made to one of the three sockets C—1, C—2, or C—3 which, as explained, are associated with the group control mechanism so that a plug connection made from socket D—3 to the uppermost socket C—1 (L8) will cause energization of the associated relay magnet 149 during minor total taking cycles and connection to the other two sockets C—2 and C—3 would cause total printing on intermediate and major total taking cycles, respectively. These circuits are controlled by cam contacts SP12 (C25) which upon closure complete a circuit from line 90, relay magnet 179 (L25), contacts SP12, to line 91. Magnet 179 will close its related contacts 179a (R22) so that the selecting circuits may be completed from line 91, wire 152 (R25), contacts SP12, switch S5 (closed for total printing operations), relay magnet 149, contacts 179a, socket D—3, plug connection 180, to socket C—3 and from thence to left side of line 90 through circuit paths already described. In this manner selected printing banks are connected to their associated accumulators during selected total taking cycles.

At L9 are shown a pair of sockets C—4 and C—5 to which plug connection may also be made to the sockets D—1 to D—7. Connection made to the socket C—5 will cause energization of the associated print selecting magnet 149 during each total taking cycle regardless of its character and connection made to the socket C—4 will effect similar operation under control of relay contacts 111b which are in series with this socket.

*Symbol printing*

In positions in which it is desired to have an asterisk accompany the printing of the total a plug connection is made from a plug socket F—1 to F—6 (R29) to the plug socket 148 (C34) of the lowest order printing position. The sockets in such position are labelled G—1 to G—6 and are separately grouped on the plugboard as shown in Fig. 10 so that plug connection 183 may be made with facility. The circuit will be completed as follows: from right side of line to cam contacts SP9 (R27) in the manner already traced, wire 184, switch S21c, plug socket F—1, connection 183 (Fig. 10), socket G—1 (C34), contacts 149a, print magnet 55, to line 90. Since contacts SP9 close at the "9" time in the cycle, the first print bar will be stopped in this position and in such position there will be an asterisk type element.

*Progressive totaling*

The machine may be conditioned for so-called progressive or sub-totaling, that is, total printing without accompanying resetting of the accumulators. When no transfer operations are to be performed, the sequence of cycles will be as follows: card feeding cycles, progressive total printing cycles, card feeding cycles. If total transfer operations are involved, the sequence will be: card feeding cycles, progressive total printing cycles, one or more transfer cycles, one or two reset cycles, card feeding cycles.

Upon detection of a group change, for example, a change in the minor group, the relay 97 (L12) will be deenergized as explained to open contacts 97b (R4) thereby interrupting further tabulating operations. The reset circuit will then be completed in the usual manner through auto reset switch S2 and the P and SP cams will function. With switch S9a (L5) closed, a circuit will then be completed near the end of the cycle from line 90, cam contacts T11 (L4) contacts P10 (timed to close near the end of the cycle), relay magnet 111, switch S9a, to line 91. Magnet 111 will close its contacts 111d (L4) to provide a holding circuit through contacts T11 which are closed until card feeding resumes. Magnet 111 will close a pair of contacts 111h (C5) which complete the printing magnet circuit from line 90, print clutch magnet 66 (L4), lower cam contacts P11, contacts 111h (switch S10c is open at this time), to line 91. This circuit is not completed until during the next following reset cycle and has for its purpose the clutching of the printing mechanism in preparation for printing group indication data on the first card cycle of the following group.

During the progressive total printing cycle, resetting of the accumulators is not effected due to the setting of various switches and near the end of the cycle, the energization of relay 111 will condition other circuits as follows: Relay 111 opens its contacts 111b (L10) to prevent the supply of current to socket C—4 so that the associated printing banks may be inactive during the following total printing and resetting cycles.

Switch S11a (L12) is in its dotted line position for progressive totaling and S12 (L12) is also in dotted line position. These switches, when open, prevent completion of the reset circuits during such cycle and no current will be supplied to sockets C—1, C—2 and C—3 so that their connected accumulators will not total print. This is due to the normally open condition of contacts 111i which prevent current flow to wire 163. However, at the end of the progressive total cycle contacts 111i close and remain so until the next card feeding cycle as explained so that during following reset cycles, wire 163 will receive current to control reset selecting operations.

It will be noted also that the group control cannot be set up during the progressive total cycle since switch S12 is moved into series with open contacts 185c (L12). These contacts are closed early in the reset cycle by magnet 185 (L6) which is energized through a circuit from line 90, magnet 185, contacts 111e, contacts P12 to line 91. The timing is such that contacts P12 close and open again before contacts P10 (L5) close so that during the progressive total cycle only magnet 111 can be energized, conditioning contacts 111e so that magnet 185 can be energized on the next ensuing total and reset cycle and close its contacts 185c to feed current to switch S12. At the completion of the total printing cycle during which minor relay 97 is again set up, the main drive clutch circuit is again completed and card feeding operations will resume.

*Transfer operation after minor group change*

If it is desired to have transfer cycles take place upon a minor group change with an intervening progressive total printing cycle, the switches S3a, S3b, S3c, and S4 are shifted from the positions in which they are shown on the circuit diagram so that upon the occurrence of a minor group change and the consequent interruption of tabulating operations, the progressive total printing cycle will be initiated through switch S9c (R5) as already explained. A single transfer cycle is now to follow which involves the re-establishment of the main drive clutch circuit through a circuit traceable from line 91 (R4), contacts 97a, switches S17b, S19b, contacts 136b, switch S3b, now closed, contacts 111g (closed during progressive total cycle), contacts UCLb, contacts 102, contacts LCLc, cam contacts P2, which close momentarily during the progressive total printing cycle, switch S1, now closed, contacts 101, magnets 95, 100, 104, and 99, contacts P1, to line 90. A tabulating cycle of operations will now follow without accompanying card feeding since switch S3a (L4) is in its dotted line position and contacts 136a are open. During the cycle the circuit through closed switch S4 (R17) will be completed and since switches S15 (C19) and S16 are closed, the relay magnet 136 (C21) will be energized in the manner already explained to operate its associated contacts of which contacts 136a (L4) will reestablish the card feed clutch circuit. Contacts 136c (R4) will re-establish the reset circuits during which total printing and resetting will take place.

At L11 are shown contacts 111i which are closed during this reset cycle and provide current from line 90, (L12) through switch S11a, now shifted, contacts 111i, to plug socket C—1 and thence through suitable plug connection to accumulators selected for resetting on minor group changes. Following the single reset cycle, tabulating operations will be resumed through the initiation of the automatic restarting circuit in the now familiar manner. If two or three transfer circuits are to take place, the resetting cycle will be delayed, as explained, for additional cycles at the completion of which the relay magnet 136 will be energized and resetting will take place after the transfer cycles have been completed.

Thus upon a group change the machine will execute a progressive total printing cycle to print the amounts standing on the accumulators and will then automatically enter upon a transfer cycle or cycles of operation followed by another total printing cycle during which the accumulators may be reset.

If desired, the progressive total printing cycle may be eliminated and transfer cycles effected immediately upon the occurrence of the group change. For this type of operation the progressive total switches S9a, S9b, S9c, S9d, S10a, S10b, S10c, S11a, and S12 are set in the positions shown on the wiring diagram.

*Settable switches*

Thus far the various types of machine cycles which may take place in varying sequence have been set forth. These have been:

Card feeding and accumulating cycles
    Resetting cycles
    Transfer cycles
    Progressive total printing cycles.

In the conditioning of the machine to effect selected cycles in any desired order, various switches have been pre-set and in order to summarize the operation of the switches they are listed below in table form, giving their location on the circuit diagram and identifying the functions which they perform.

|  | Switch | Location | Function when shifted |
|---|---|---|---|
|  | S1 | C4 | Permits completion of the automatic restarting circuit. |
|  | S2 | R6 | Permits completion of the automatic resetting circuit. |
| Transfer | S3a | L4 | Shifts control of the card feed clutch magnet for transfer operations. |
|  | S3b | R3 | Permits separate control of the main clutch circuit for transfer operations. |
|  | S3c | R5 | Shifts control of the reset magnet circuit for transfer operations. |
|  | S4 | R17 | Permits completion of the transfer cycle controlling circuits. |
|  | S5 | R25 | Permits completion of the total printing control circuits. |
|  | S6 | C10 | Renders major control operative. |
|  | S7 | C11 | Renders intermediate control operative. |
|  | S8 | C12 | Renders minor control operative. |
| Progressive total printing | S9a | L5 | Permits completion of the circuit through relay 111. |
|  | S9b | L6 | Permits repeated reset circuit completion. |
|  | S9c | R5 | Closes automatic reset circuit. |
|  | S9d | R3 | Short circuits contacts 111g. |
|  | S10a | R3 | Permits completion of re-starting circuit. |
|  | S10b | C18 | Permits completion of transfer cycle controlling circuits. |
|  | S10c | C5 | Permits completion of print clutch circuit. |
|  | S11a | L12 | Permits completion of zero button circuit. |
|  | S12 | L12 | Permits completion of automatic shunt circuit. |

|  | Switch | Location | Function when shifted |
|---|---|---|---|
| Successive resetting | S13a | L6 | Permits completion of reset shunt circuit for repeated transfer cycle operation. |
|  | S13b | L10 | Permits completion of major zero button circuits. |
|  | S14a | L10 | Permits completion of intermediate zero button circuits. |
|  | S14b | L12 | Permits completion of group control shunt circuits. |
| Repeated transfer | S15 | C19 | Eliminates first transfer cycle. |
|  | S16 | C20 | Eliminates second transfer cycle. |
| Transfer after major group change | S17a | L4 | Permits completion of card feed clutch circuit on major group changes. |
|  | S17b | R1 | Permits completion of automatic starting circuit upon major group changes. |
|  | S18a | R5 | Permits completion of automatic reset circuit on major group changes. |
|  | S18b | R18 | Permits completion of transfer cycle circuits upon major group changes. |
| Transfer after intermediate group change | S19a | L5 | Permits completion of card feed clutch circuit on intermediate group changes. |
|  | S19b | R3 | Permits completion of automatic starting circuit upon intermediate group changes. |
|  | S20a | R5 | Permits completion of automatic reset circuit on intermediate group changes. |
|  | S20b | R18 | Permits completion of transfer cycle circuits upon intermediate group changes. |

The switches listed above are grouped and identified with legends which indicate the machine operations for which they are shifted from the positions shown in the circuit diagram. Thus, switches S3a, S3b, S3c, and S4 are shifted whenever transfer operations are to be performed and switches S15 and S16 are open when there are to be two or three transfer cycles, respectively. If the transfer cycles are to take place after a major group change, the switches S17a, S17b, S18a, and S18b, are shifted, and if transferring is to be effected after an intermediate group change, the last four switches are shifted. It will be apparent that various combinations of conditions may be set up by shifting the groups of switches in various combinations and the machine thus lends itself to the solution of a great variety of problems, certain of which will be set forth hereinafter.

*Transfer operations*

For transferring of an amount from one accumulator to another, plug connections 190 (Fig. 10) are made from the read-out plug sockets 150 (R33) of one accumulator to adding plug sockets 143 of the accumulator to which the data are to be transferred and the transferring circuit will be completed through the read-out device of the first accumulator in the same manner as explained in connection with reading out the total to the printing mechanism. Since during transferring, however, the impulse emitting contacts SP1 to SP9 are inoperative, use is made of a second set of impulse emitting contacts ZL1 to ZL9 (R26) which close successively during each machine operation to emit impulses to the wires 154.

Intermediate the contacts and the wires are relay contacts 140a controlled by the relay magnet 140 (C17) which as explained above, is energized throughout the transfer cycles of operation so that during a transfer cycle the amount standing on any accumulator will be transferred directly to any other accumulator under control of contacts ZL1 to ZL9.

An example will now be given of the manner in which successive transferring operations are utilized to effect a summation or cross-footing of the amounts standing in five accumulators. The connections for the solution of the problem are diagrammatically indicated in Fig. 12 at the bottom of which the operations occurring during the first, second, and third transfer cycles are indicated. For example, on the first cycle, the amount in accumulator II is transferred to accumulator III and the amount in accumulator IV is transferred to accumulator V. During the second cycle, the amount in accumulator III is transferred to accumulator V which will thus contain the sum of four accumulators. During the third cycle, the amount in accumulator I will be added to those in accumulator V.

The entering circuits of accumulators I, II and IV are directly connected to the lower brushes. The other two accumulators are connected to the lower brushes through distributing relay contacts 191a which are normally closed as shown during entering operations. The normally open contacts 191b terminate in plug sockets 192 and 193 which are interconnected as shown in Figs. 10 and 12 for the problem under consideration. The third blade of the relay contacts is connected to a plug socket 194.

The sockets in Fig. 10 are labelled "Center", "Closed", and "Open" for facility in identifying them as wired to the center blades, outer, normally closed blade, and outer, normally open blade.

Reference to plugboard diagram (Fig. 10) will show the location of the several plug sockets, and after inspection of Fig. 12 it will be readily apparent how plugging connections are effected. The contacts 191a and 191b are provided in groups of nine, each controlled by a distributing relay magnet 191. The machine is provided with six such relays whose plugboard sections are labelled 1 to 6 in Fig. 10. As will be hereinafter explained, the magnets 191 may be selectively operated during the several transfer cycles to shift the related contacts so that if during the first transfer cycle the magnets 191—2 and 191—5, labelled "1st cycle", are energized closing the contacts 191b associated therewith, it will be noted that the read-out device of accumulator II is connected through the upper pair of contacts 191b to accumulator III and that the read-out device of accumulator IV will be connected to accumulator V. During the second transfer cycle, the magnet 191—3, labelled "2nd cycle", will close its contacts 191b and accumulator III will be connected to accumulator V for transfer between the two, and on the third transfer cycle, the magnet 191—4, labelled "3rd cycle" will connect the read-out device of accumulator I to accumulator V. In Fig. 12 but a single set of contacts 191, 191a has been shown for each coil 191 but it will be understood that there is a similar set of contacts used for each denominational order involved.

Figure 11B:
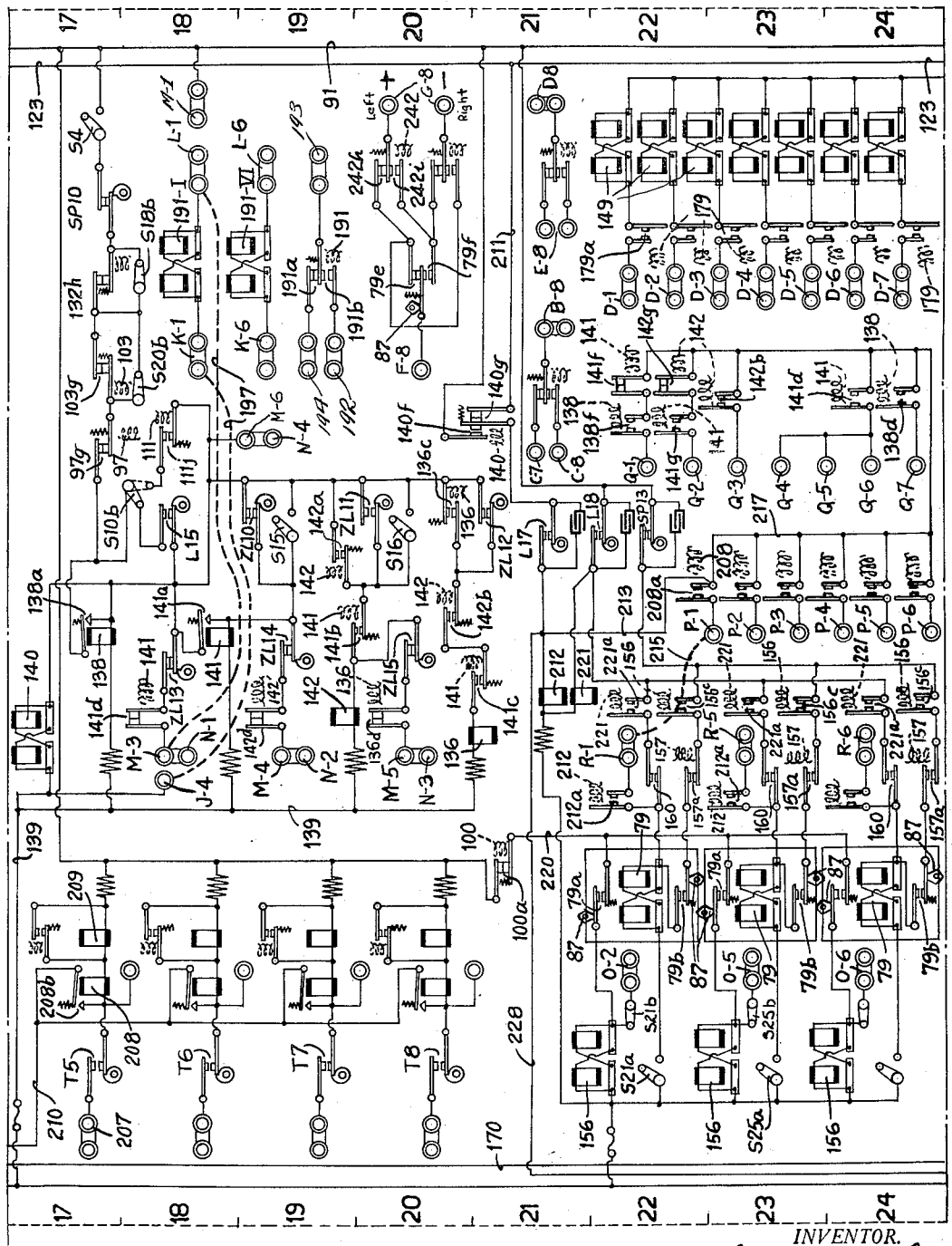
Figure 11C:
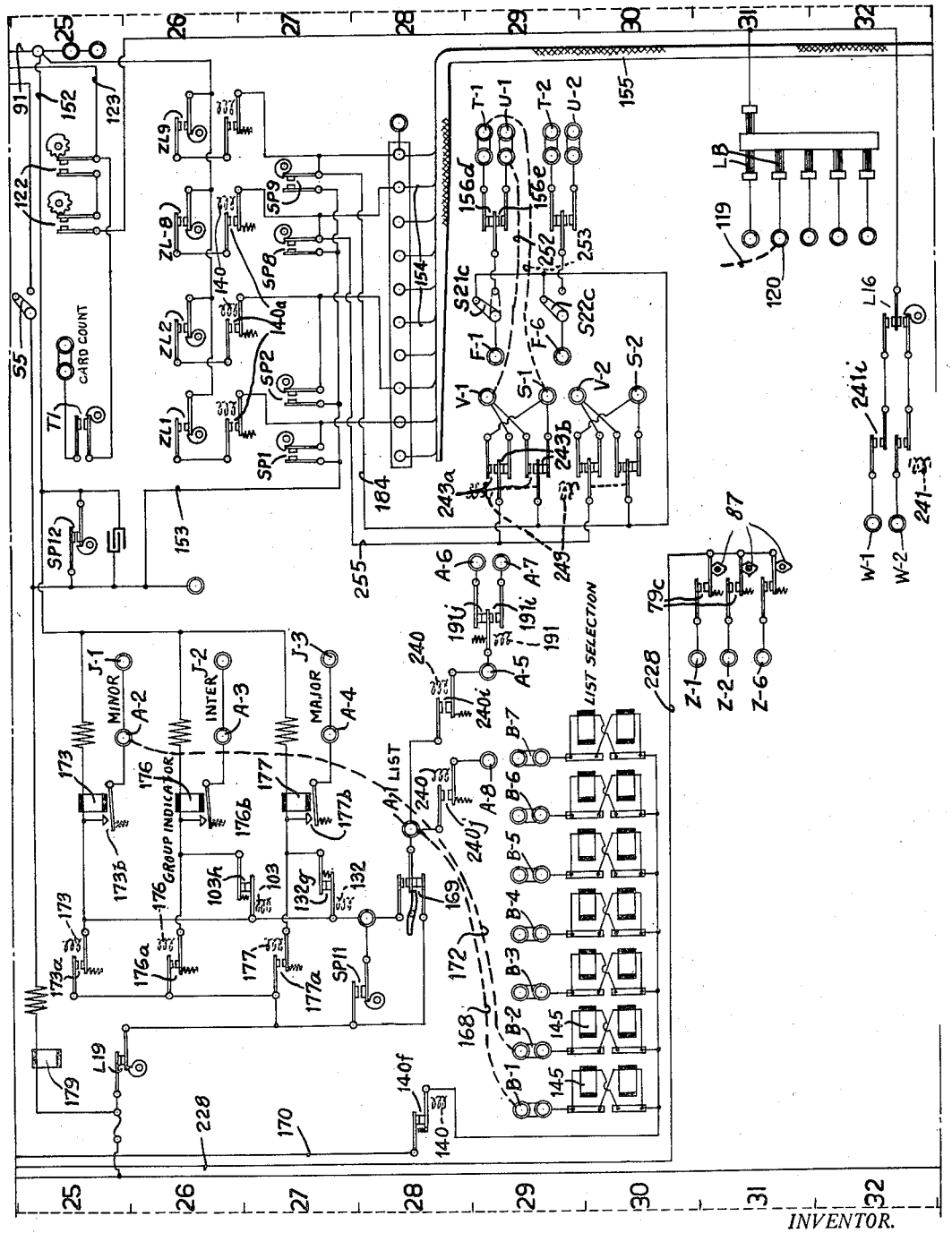

Two of the relay magnets 191 are shown in Fig. 11b at R18, R19. They are connected to plug sockets L—1 to L—6 and K—1 to K—6 through which they may be connected for operation during any of the transfer cycles. If the relay is to be operated during the first transfer cycle, a plug connection 197 (C18) is made from socket L—1 to a socket M—3 and a second plug connection is made from socket K—1 to a socket J—4 (see also Fig. 10). This plugging provides a circuit which is traceable as follows: from line 90 (L17), wire 139, plug socket J—4, plug connection 197, socket K—1, magnet 191, socket L—1, second connection 197, socket M—3, relay contacts 141d, cam contacts ZL13, contacts 138a, to right side of line 91 through the familiar circuit. This circuit will be completed at the commencement of transferring cycles of operation and will remain established until contacts 141d open under control of magnet 141, which, as explained, is energized near the end of the first transfer cycle.

Relay 191 may likewise be connected in series between plug socket M—4 (C19) or M—5 (C20) and socket J—4 whereby the circuit therethrough will be completed for the second and third transfer cycles, respectively.

Referring again to Fig. 12, the relays 191, labelled "1st cycle", will be energized during the first cycle and deenergized during the second and third cycles, during which cycles the relays 191—3 and 191—4 will be energized to shift their contacts.

In Fig. 10, plug connections in columns J, K, L, and M are shown as made for the problem of Fig. 12. Plug socket J—4, it will be noted, supplies current for all three transfer cycles. Thus, during the first cycle the current path is through M—3, L—2, K—2, J—4. A parallel path also follows from M—3, L—2, L—5, K—5, K—2, J—4. During the second cycle the path is M—4, L—3, K—3, K—4, K—5, K—2 to J—4. During the third cycle the path is from M—5, L—4, K—4, K—5, K—2 to J—4.

It will be apparent that with the flexible arrangement disclosed, any accumulator may be caused to transfer its reading to any other accumulator during any of the transfer cycles. For certain classes of work it may be desirable to repeatedly transfer the amount in one accumulator to another. This can be effected by connecting the associated distributing relay sockets K—1, L—1 to two or three of the sockets M—3, M—4, and M—5.

A further example illustrating the advantages of total transferring in tabulating machines resides in the manner in which major totals may be built up by successive transferring of minor totals. Heretofore in practice it has been customary to connect the minor, major total accumulators in multiple to receive the same amounts from the record cards and by resetting them selectively according to the character of the group change there would stand recorded at the completion of the tabulation the different classes of totals, one or more of which minor totals may be in error. Such errors could not be detected by mere inspection of the results.

With the present system, the same problem is handled by entering the amounts from the cards into the minor accumulator only, and, upon each minor group change, effecting a transfer of the minor total to the major accumulators. Thus the major total is built up by the accumulation of the minor totals and if the major total is correct, the lesser totals must necessarily be correct also.

*Subtractive transferring.*—It may be desired instead of directly transferring the number standing on an accumulator to another to transfer the complement whereby the resulting number will represent the balance of those merged. This is brought about as follows: a relay 156 (L22, L23, L24) is provided for each accumulator and the associated contacts 156a and 156b are shown at R34, R36, and R38. The contacts 156b are connected through wires 202 and cable 155 to the emitting contacts SP1 to SP9 in a complementary relationship; that is, the SP1 contact is wired to the "8" contacts 156b; the contacts SP2 are wired to the "7" contacts 156b, and so on. Thus, if any relay 156 is energized, the associated read-out devices will be disconnected from wires 154 and connected to wires 202 so that the number transmitted will be the nines complement of the number standing on the accumulator.

The relay magnets 156 are arranged so that they may be selectively energized during any of the transfer cycles and are accordingly wired to plug sockets O—1 to O—6 (L22) from which connection may be made to sockets N—1, N—2 or N—3 (C18, C19, C20). Such a connection is shown at 204 (Fig. 10) between O—1 and N—1 and the circuit to magnet 156 will parallel the circuit to the relays 191 so that the switching of contacts 156b to cause a complement reading will take place during the first transfer cycle concurrently with the interconnection of the two accumulators between which transferring is to be effected. Obviously connections between socket O—1 and sockets N—2 and N—3 will cause the complementary transferral to occur during the second and third transfer cycles, respectively.

A plug socket N—4 (C19) is provided to which the sockets K—1 to K—6 or O—1 to O—6 may be connected. When so connected, the selected magnets 191 or 156 will be energized for each transfer cycle and transferring either straight or complementarily will occur each transfer cycle from the selected accumulator. The circuit to magnet 156, for example, is traceable from right side of line, switch S4 (R17), contacts SP10, switches S18b, S20b, contacts 97g, contacts 138a, socket N—4, connection such as 206 (Fig. 10), socket O—4, magnet 156, to line 90. A typical example of the combined uses of cross-addition and cross-subtraction is schematically illustrated in Fig. 13 which illustrates the operations for computing a payroll of employees in which the amounts entered into the accumulators are derived from record cards containing perforations representative of gross wages earned and other data pertaining to various items to be deducted.

In the example chosen, the deductions, which are six in number and represented by the letters $b$, $c$, $d$, $e$, $f$, and $g$ require to be combined and subtracted from the gross wages $a$ to provide a total of the net wages and a total of all deductions. Accumulator I receives from the cards the gross wages $a$ and the deductions are entered into accumulators II, III, and IV, these being split to accommodate the six amounts. During the first transfer cycle, relay magnets 191 (1st cycle) are energized and the amounts $b$, $d$, and $e$ are transferred in the direction indicated to combine with $c$, $f$, and $g$, respectively, so that at the end of this cycle the right hand section of accumulator II will hold the amount $b+c$, the left section of accumulator IV will hold the amount $d+f$, and the right hand section of the accumulator IV will hold the amount $e+g$. During the second cycle, relays 191 (2nd cycle) are energized and the amount $d+f$ in the left hand section of accumulator IV is transferred to the right hand section of IV and simultaneously the amount $b+c$ in the right hand section of II is transferred in complementary form to accumulators V and I. During the third cycle, the amount $d+e+f+g$ standing in the right hand section of accumulator IV is transferred in complementary form to accumulator V and accumulator I. Thus, on accumulator I a net balance of the employees' wages, i. e., the gross wages less the deductions, will be obtained while in accumulator V the total deductions will be accumulated in complementary form and this amount may be converted into true form during total taking operations to print the true total of the deductions as will be explained.

*Balance selection*

In the transference of items from one accumulator to another additively and subtractively, it is apparent that the status of the balance may change between negative and positive and such status is determined by means of a so-called double-step relay which is brought into operation through plug connections to be described.

When balances are obtained by complementary addition in which items of one class are entered in their actual value and those of another class in their complementary value, it is clear that a change in the type of balance; that is, a change from a credit or positive to a debit or negative balance or vice versa, can only occur when an item of the class to which the balance changes is added. If the credit items are entered according to their positive value and the debit items according to their complementary value and a credit balance stands on the accumulator at the time, it can only be changed into a debit balance, if a debit entry is made. This will be clearer from a specific example. If a credit value designated by 160 stands on the accumulator and a debit item amounting to 270 is entered in its complementary value of 99730, the character of the balance would be changed thus:

Credit value _____ 160
Complement of debit item 270_____ 999999730

Resulting in a debit balance (complementary) of _____ 999999890

In another case, if a credit balance stands on the accumulator and a debit item of smaller value is complementarily added, the character of the balance does not change, thus:

Credit value _____ 160
Complement of debit item 29_____ 999999971

Resulting in a credit balance of____ 000000131

It will be noted that at the end of the actual entry of the complement the accumulator elements to the left of the significant figures in this case stand at zero and that the nines were disposed of through a carrying operation which takes place in the latter part of the machine cycle after the actual entries.

This carrying operation in the extreme left hand accumulator wheel through which the nine entered from a debit item (complementary) is disposed of is made use of in conjunction with the special debit indicating perforation which is made in a selected column of each record card usually in the "X" index point position to designate such card as being a debit card.

In the problem of cross-footing explained hereinbefore, it was pointed out that the sum of the deductions in accumulator V was accumulated in complementary form. In order to print the value as a true amount, it is obvious that the impulse emitting mechanism will have to emit impulses in transposed order to the accumulator read-out devices in order to print this true number. This transposition is effected by the double-step relay shown in Figs. 8 and 9.

It is apparent that two impulses to the magnet 79 are required to change the condition of the contacts and restore them again to normal. Thus, the first impulse may be derived from an "X" punched card denoting a negative item. This will set the contacts in condition to effect the true printing of negative balance as will be shown, providing a second impulse is not received by the relay to return the contacts to normal condition to print a positive balance. Whenever the negative balance in the accumulator becomes positive, the highest order wheel passes from nine to zero and closes the contacts 160 of Fig. 6 at the same time that it adds the elusive one to the lowest order. Closure of contacts 160 provides the second impulse to the magnet 79 to restore it to normal condition to print a positive balance.

When balancing, a rule may be stated with regard to the action of the double-step relay; namely, if the number of primary impulses as from "X" punched cards plus the number of secondary impulses as from the highest order carry mechanism results in an even number, the relay contacts will be in even or normal condition; consequently, there will be no transposition of the emitter lines to the reading-out mechanism. In consequence, normal impulses will be received to print or transfer the balance.

Conversely, if the number of primary impulses plus the number of secondary impulses results in an odd number, the relay contacts will be in odd or abnormal condition and will transpose the emitter lines to the accumulator read-out mechanism, thus providing complementary impulses to control the type bars to print complementary to nine in all denominations.

The operation of the device will be made clearer by tracing the operation through a plurality of steps during which the several selections are made.

| Kind of item | Amount of —item | Transfer | Amount entered in Acc. V from card | Indication on Acc. V |
|---|---|---|---|---|
| 1. Credit | 270 | | 270 | 000000270 |
| 2. Credit | 110 | | 110 | 000000380 |
| 3. Debit | 110 | (1) | 999999890 | 000000270 |
| 4. Debit | 110 | (1) | 000000890 | 000000160 |
| 5. Debit | 270 | | 000000730 | 999999890 |
| 6. Debit | 270 | (1) | 000000730 | 999999620 |
| 7. Credit | 409 | (1) | 409 | 000000029 |

The first card carrying a credit item enters this item in its true value into the balance accumulator V which is in normal position for true number printing and transferring. The second card likewise carries a credit item. There is, therefore, no designating perforation on either card to operate the double-step relay and no carrying operation involved on the left hand accumulator wheel of Acc. V so that if it is assumed that the credit balance accumulator is normally in position to print the true amount standing thereon, this condition will not be disturbed. The third card carries a debit item whose value, however, is too small to change the character of the balance.

In this case the designating perforation on the debit card operates relay 79 to momentarily connect accumulator V for printing the complement of its reading but the carrying operation clearing the accumulator wheels to the left re-connects the accumulator for true number printing so that at the end of the entry the accumulator V still remains in condition for normal printing. The fourth card carrying a debit item operates in like manner as the value of this item is still not sufficient to change the character of the balance standing on accumulator V.

The fifth card carries a debit item sufficient in value to change the character of the balance, that is, when its complement is entered there is no carrying action as a nine remains on the left hand counter wheel of Acc. V. In this case, as the debit card is analyzed, its designating perforation connects the accumulator for inverted printing and as there is no subsequent carrying operation of the left hand counter wheel, the connection persists and, if printing is effected after this entry, it will be effected from the accumulator in its true value representing a debit balance. The sixth card being another debit card should still select the accumulator for inverted printing. The designating perforation shifts the connections, temporarily selecting the accumulator for direct reading but the ensuing carry operates to re-connect the accumulator for inverted reading. The seventh item will change the connection again since a carry is involved. The circuits involved in these operations will now be traced on the wiring diagram.

*Primary impulse to double-step relay.*—Referring to Fig. 11a the upper brush plug socket 117 (R10) which is connected to the upper brush which traverses the column of the record card in which the special debit item indicating perforation is made is connected by a suitable plug wire as 200 (Fig. 10) to a socket 207 (L17). A cam contact T5 is adapted to close momentarily as this index point position is passing the upper brushes UB so that when a special "X" perforation is analyzed, a circuit may be completed from left side of line, wire 116 (L13), upper brush UB, socket 117, plug connection 200, to socket 207 (L17), cam contacts T5, relay magnets 208, 209, to line 91. This circuit is held by contacts 208b which hold the circuit through wire 210 and contacts T2 (L13).

During the following adding cycle a circuit is completed from line 91, contacts 97b (R3), contacts 103a, lower card lever contacts LCLd, wire 123, wire 211 (R21), contacts 140g, cam contacts L17, relay magnet 212, to line 90. A parallel circuit extends from contact L17 through wire 213, contacts 208a (closed due to the presence of a debit indicating perforation), to socket P—1 from which the circuit extends through plug connection 215 to a socket R—1 (see Fig. 10), thence through contacts 212a (closed by relay 212), double-step relay magnet 79, switch S21a, to line 90. In this manner, the double-step relay magnet receives the so-called primary impulse whenever a debit designating perforation is sensed by the upper brushes and which indicates that a complementary value is about to be entered into the accumulator.

When transfer operations are being performed, the primary impulse may also be impressed upon the double-step relay magnet 79 when an amount is transferred subtractively from one accumulator to another, as, for example, in the cross-footing problem outlined above (Fig. 13). In such example it will be recalled that the amount accumulated in the right hand section of accumulator II was transferred in complementary form to accumulator V so that the double-step relay is to receive a primary impulse during the second transfer cycle. The circuits involved in providing the primary impulse to the transfer cycles will now be traced.

It will be recalled that during transfer cycles the relay 140 (C17) is energized. This will cause closure of contacts 140f (C21) so that a circuit will be completed from line 91, contacts 140f, contacts L17, relay magnet 212, as during adding cycles. A parallel circuit will follow from contacts L17, wire 217, contacts 141d, plug socket Q—6, plug connection 219 (see Fig. 10), to socket R—1, contacts 212a, double-step relay 79, switch S21a, to line 90. In this manner the double-step relay may be energized during a selected transfer cycle.

It will be recalled that contacts 141d are closed during the second transfer cycle due to the energization of their controlling relay 141 at such time. If the connection 219 were made to socket Q—7 the impulse would occur during the first transfer cycle when contacts 138d close and if made to socket Q—3 it would occur during the third cycle when contacts 142h are closed. Since the relays when energized remain so until transferring cycles are terminated socket Q—7 will receive an impulse in each of the three cycles, sockets Q—4, Q—5 and Q—6 in the first two and socket Q—3 in the third only.

Further sockets Q—1 and Q—2 are provided of which Q—1 has contacts 138f and 141f in series so that the socket receives an impulse only during the first cycle. Q—2 has contacts 141g and 142g in series and hence receives an impulse only during the second cycle.

The magnet 79 will cause closure of a pair of contacts 79a (L23) to complete a holding circuit which extends from line 90, inverting relay 156, contacts 79a, wire 220, contacts 100a, to line 91. Thus the plug connection 219 provides for reversing the emitter impulses and also provides the primary impulse to the double-step relay.

*Secondary impulse.*—If the highest order of the accumulator receiving the complementary amount passes from nine to zero, indicating that the addition of the negative amount resulted in a positive balance, the contact 160 (Fig. 6) of an accumulator will have closed momentarily. This provides a further or secondary impulse to the double step relay magnet 79 through a circuit traceable from line 90, switch S21a (L22), relay magnet 79, contacts 160, contacts 221a, contacts L18, to line 91. Contacts 221a are closed by relay 221 (C21) which relay is energized through contacts L18. If the machine enters upon a total printing or transferring cycle of operations after the double-step relay has received an odd number of impulses, the related relay magnet 156 will have been energized through the closed contacts 79a and the associated accumulator will have its contacts 156b (R34) closed so that complementary impulses will be transmitted to cause printing or transferring of the true value of the complement amount standing in the accumulator.

It will be understood that there is provided a double step relay 79 and inverting relay 156 for each accumulator and that for each one plug connections may be made according to the operating requirements of the problem to be undertaken. Thus Acc. I may be conditioned to print or transfer balances during a first transfer cycle and Acc. II may do so during a second transfer cycle and may also be conditioned to receive complementary entries from cards or another accumulator.

During the total printing and reset cycle of operation the double-step relay 79, if it has received an odd number of impulses will receive an additional impulse to restore it to normal position. This is effected as follows:

If the associated accumulator is to be reset on the total taking operation, a pair of contacts 157a (C23) which are closed by the zero button magnet 157 will complete a circuit from right side of line through cam contacts SP13 (C22) a pair of contacts 156c controlled by the reversing relay, contacts 157a contacts 79b (closed if the relay is in "odd" position), magnet 79, to line 90. Thus, on resetting the "odd" condition of the double-step relay is restored to "even" or normal condition in readiness for the next group of cards.

Cross-footing problem

In Fig. 14 is shown diagrammatically the manner in which cross-footing may be effected with four accumulators, each of which may at the time of transferring contain either a positive or a negative quantity, the latter indicated by the presence of a complementary number. The various cycles are indicated in the left hand column and beside each accumulator is indicated the condition of its related double-step relay under columns headed "DSR". On the first item entering cycle, positive items 20, 10, and 64 are entered into accumulators II, IV, and V and a negative amount of 50 entered into accumulator III. It will be understood that this negative quantity is entered as a nines complement which is perforated as such on the record card. It will be further understood that the record card carries a special "X" perforation to indicate its negative arithmetical sign and, as explained, will effect energization of the related double-step relay to shift it to its "odd" position. Thus, after the first item entering cycle, the accumulator and related double-step relay settings will be as indicated on the line designated "Acc. setting". On the next item entering cycle, it is assumed that a positive entry of 30 is made in accumulator III and negative amounts 2, 23, and 42 are made in accumulators II, IV, and V. The actual amounts entered are indicated in dotted outline, these being the complements of the negative numbers.

It will be noted in each instance that the negative item has changed the condition of the related double step relay.

In accumulators II and V the resulting sum will cause the highest order wheels to pass through zero and the elusive one will be carried to the units orders and will incidentally cause a further shifting of the related double-step relays. At the end of the cycle, the amounts standing on the several accumulators will be as indicated. Assuming that a group change occurs at this point, the machine is ready to perform a transfer cycle of operation to cause a cross addition of the four amounts. The sequence will be such that during the first transfer cycle, the amounts in accumulators II and III will be combined; during the second, those in accumulators III and IV will be combined; and during the third, those in accumulators IV and V will be merged.

During the first transfer cycle, the amount 18 will be directly transferred from accumulator II to accumulator III, resulting in a setting of the latter counter of 9997 and during the second transfer cycle, this amount is transferred to accumulator IV, and being a complementary number the transfer will be accompanied by an operation of the double-step relay of accumulator IV so that its setting will be altered.

It may be stated at this point, that for the problem under consideration, the associated inverting relays are not plug connected for operation with respect to Acc. II, Acc. III and Acc. IV so that the readings of these accumulators are transferred as they stand. The inverting relay associated with Acc. V is connected however so that it conditions the read-out for direct printing of the cross-sum when the double-step relay is "even" and for inverted reading when the relay is "odd".

Since there is already a complementary number in accumulator IV, the addition of another complementary number will effect a transfer through the highest order to add the elusive one to the lowest order. This again will shift the double-step relay of Acc. IV. During the third transfer cycle, the complementary number 9984 is transferred to accumulator V, causing a shift in the double-step relay and the resulting highest order transfer shifting back again to "even". The amount now standing on accumulator V is "1", the true balance of the several entries of the accumulators.

The machine, after the last transfer cycle, will enter upon the total printing cycle and since the double-step relay related to Acc. V is in "even" position, the amount standing thereon will be printed in its true form. Had the amount standing thereon been a complementary number, the double-step relay would have been in "odd" position, thereby causing an inverted connection between the emitter and the read-out devices of the accumulator whereby the complementary amount would be printed as its corresponding true number.

The problem just explained has been in the nature of a summation of quantities, any of which may represent either a positive or a negative amount so that the expression may be written symbolically, as $\pm a \pm b \pm c \pm d$.

In Fig. 15 is shown a number of plugboard sockets which are connected as shown for the solution of a problem similar to that just explained, but wherein true number printing is to follow the transfer operations. The sockets R—3, R—4, R—5 are connected by plug wires 223 to sockets 224 and further plug connections 225 are made from sockets 227 to sockets Z—1 to Z—6 as shown. Certain of these plug sockets are again shown in Fig. 16 with the contact devices with which they are related. Sockets 224 and 227 are shown at C38, C39, and C40 where the upper three sets are designated A¹, the next two as B¹ and the last one as C¹. This grouping corresponds to the designations on Fig. 15. Between the A¹ sets of sockets 224 and 227 are relay contacts 138', 141' controlled by their respective relay coils 138 (C17) and 141 (C18) which, as already set forth, are energized for the first and second reset cycles, respectively. Between the sockets of B¹ are contacts 141m and 142f, operated respectively on the second and third cycles, and between sockets in the C set are contacts 142n operated on the third transfer cycle. The sockets Z—1 to Z—6 are found on the diagram at C31 where they are connected to double step relay contacts 79c which, through wire 228, are connected to cam contacts L17 (C21).

With the plug connections made as shown, transferring between accumulators will occur selectively. That is, if the sending accumulator contains a true number the printing will be direct and if it contains a complementary number it will be inverted into a true number before printing.

Figs. 16, 17, and 18 show the plug connections for the successive selection of the several double-step relays 79 under control of the plug connections of Fig. 15. Considering Fig. 16; at the time of transferring, the contacts 79c associated with accumulator II will be open since the double step relay is in "even" condition and the number is to be printed directly (see Fig. 14); therefore, the circuit indicated cannot be completed and the double-step relay 79 of accumulator III will not be energized but will consequently remain in the position it occupied at the beginning of transferring operations, namely, "odd". In the second transfer cycle, however, with the inverting relay 156 connected as explained, the true number equivalent will be printed. The relay contacts 79c of accumulator III (Fig. 17) will be closed due to the "odd" condition of its double-step relay and the circuit will be completed from contacts L17, contacts 79c, socket Z—4, plug connection 225, contacts 142f, 141m, both of which are closed during the second transfer cycle, socket 224, plug connection 223, socket R—5, contacts 212a, and double-step relay 79 of accumulator IV. This circuit, accordingly, changes the condition of the double-step relay from "odd" to "even" as indicated in Fig. 14.

Since there is a transfer from highest to lowest order, the relay will again be energized as explained to return the setting to "odd". Thus, during the third transfer cycle, the contacts 79c of accumulator IV will be closed (see Fig. 18) and the circuit will be completed during this cycle which may be traced in Fig. 18 through sockets Z—3 and R—4 to energize double step relay 79 of accumulator V.

Finally, since there is a highest order carry in accumulator V, the secondary impulses will be impressed on the double-step relay, changing its condition back to "even" so that a transposition of the emitter line is not effected and the amount standing in the accumulator will consequently be printed as a true balance.

Balancing problem

In certain classes of work, groups of record cards may be accompanied by so-called "balance forward" cards which contain information relating to some previous balance. These cards are designated with a special "X" perforation in a selected column. The balances represented by the cards may either be positive or negative so that in a particular group of cards the following types may obtain:

Positive balance cards_____ X punched in column 75
Negative balance cards_____ X punched in column 75 and in column 65
Positive detail cards
Negative detail cards_____ X punched in column 65.

With these cards it may be desired to obtain the new balance which may be either positive or negative and also obtain a new total of all positive items and the total of all negative items. The manner in which this is carried out in the machine will now be explained.

The "X" punchings are sensed as the record cards pass the upper brushes and for this purpose a plug connection 230 is made between the upper brush socket 117 (see Fig. 10) of column 65 and a socket 207—1 (L14) and a second connection 231 is made from the plug socket 117 of column 75 to a plug socket 232 which is also found at L14.

As a record card bearing an X65 perforation passes the upper brushes, a circuit will be completed from upper brush UB (R10), plug socket 117, plug connection 230, socket 207—1 (L14), cam contacts T3, timed to close at "X", to a plug socket H—1 from which plug connection 234 (see also Fig. 19) is made to one of the sockets K—1 (R18), thence through distributing relay 191, socket L—1, thence through a plug connection 235 to socket M—1 and to line 91. In this manner, whenever a negative balance card is sensed, the circuit just traced will be completed and the distributing relay 191 will be energized. A parallel circuit will also be completed from plug socket H—1 (L14) through relay magnets 237, 238 to line 91.

If the card contains a balance designating perforation in column 75 a circuit will also be completed from the proper upper brush socket 117 to socket 232 (L14) and from thence through upper card lever contacts UCLh, cam contacts T9, timed to close at "X", relay magnet 239, to line 91. A parallel circuit will extend from contacts T9 through relay magnet 240 to line 91 and the relay contacts 239a will provide a holding circuit which extends through cam contacts T2 (L13). Magnet 240 closes a pair of contacts 240a (L15) and the distributing relay will close a pair of contacts 191c (L15) so that if the record card contains an X65 and X75 punching, distinguishing it as a negative balance card, the consequent closing of contacts 191c and 240a will complete a circuit as follows: from line 90, cam contacts T2 (L13), contacts 191c, 240a, relay magnet 241 to line 91. Magnet 241 will close a pair of contacts 241a (L16).

It may be explained at this point that a balance card associated with any group is the first card of that group to be fed through the machine and that as this card passes the upper brushes, group control mechanism will detect the change in group number between it and the last card of the previous group and cause initiation of other cycles of operation according to the plugging arrangement of the machine.

During the incidental resetting operation, the closure of cam contacts SP14 (L16) will complete a circuit from line 90, switch S11a (L12), wire 244, upper cam contacts SP14 (L16), contacts 241a, now closed, parallel to relay magnets 242 and 243, to line 91. Magnet 242 will close a pair of contacts 242a to provide a holding circuit which extends through cam contacts SP15 so that these magnets will remain energized during the next card feeding cycles during which the balance card passes the lower brushes. This circuit will be maintained throughout the analysis of the cards in the group and until the next following reset cycle during which cam contacts SP15 open. Thus, with a negative balance card present, relay magnet 243 is energized and contacts 243a and 243b (C29) associated therewith will be shifted. These contacts control printing of an appropriate symbol in a manner which will be set forth hereinafter.

In Fig. 20 is schematically shown the entering circuits for the record cards controlled by the X65 and X75 perforations. The lower brush socket 120 is connected through connection 236 to a plug socket 245 which connects with the contacts 191a, 191b. These in turn are wired to contacts 240c and 241c and also to contacts 242c and 242d, the center blade of which terminates in plug socket 246. This arrangement of contacts is shown on the circuit diagram at R13 and R14. The contacts 240c are wired to a plug socket 247 from which a plug connection 248 may be made to the entering socket 143 of accumulator I and contacts 241c terminate in a similar plug socket 249 through which a plug connection 250 is made to the entering socket 143 of accumulator II. Between socket 246 and the entering socket 143 of accumulator III is interposed contacts 191f and 191g controlled by another of the distributing relays 191 connected to operate during transfer cycles so that accumulator III may receive an entry from either accumulator I or II.

As pointed out above,

An X65 perforation will cause energization of relay 191

An X75 perforation will cause energization of relay 240

An X65 and X75 perforation will cause energization of relays 191, 240, 241, 242, and 243.

Assuming the first card of the group to be a positive balance card having an amount "50" punched thereon and containing the distinguishing X75 perforation, then, as the card passes the lower brushes, relay contacts 240c will be open and the circuit from the lower brushes (Fig. 20) will extend through contacts 191a, 242c, and 191g to balance accumulator III and no entries will be made in accumulators I or II.

If the next card is a negative detail card containing an amount "—40" and an X65 perforation, the relay magnet 191 will be energized and the entering circuit will follow from the lower brushes through contacts 191b, contacts 241c, plug connection 250, to accumulator II. A third detail card containing a positive amount "80" and having no "X" perforation will cause an entry to be made through contacts 191a, 242c and 191g to accumulator III and a parallel circuit through contacts 191a, 240c, plug connection 248 will be made to enter the same amount in accumulator I. Thus, if the group change now occurs, there will be an amount "80" standing on accumulator I, an amount "40" on accumulator II, and an amount "130" on accumulator III.

The transferring mechanism is arranged to effect a single transfer cycle following the group change and since relay magnet 243 is not energized, its contacts 243c and 243d will remain in the position shown in Fig. 20 so that transferring will be effected from the read-out device of accumulator II through contact 243d, contacts 191f, closed during transferring, to accumulator III and, as explained hereinbefore, the emitting circuits will be reversed so that the complementary value will be transferred and added to the amount "130".

The example just traced may be represented as Example A below:

*Example A*

|  | Acc. I | Acc. III | Dsr. | Acc. II |
|---|---|---|---|---|
| Balance card +50 (X75) |  | 50 | Even |  |
| Detail card −40 (X65) |  |  |  | 40 |
| Detail card +80 | 80 | 80 | Even |  |
|  | 80 | 130 | Even | 40 |
| Transfer |  | 99959 | Odd |  |
|  | Carry | 100089 1 | Even |  |
| Print | 80 | 90* |  | 40 |

In Example A is indicated the positioning of the double-step relay associated with the balance accumulator III where it will be noted that it remains in "even" or normal condition until the complement is added thereto, which, as explained, causes it to assume "odd" position. However, the highest order carry will shift it back to even so that during printing, the true amount standing on the accumulator will be recorded as indicated on the line labelled "Print".

A further example showing the functioning of the mechanism when the balance card is negative is illustrated in Example B where it is assumed the balance card is negative and the detail cards remain the same. Thus, in Example B,

*Example B*

|  | Acc. I | Acc. III | Dsr. | Acc. II |
|---|---|---|---|---|
| Balance card −50 (X65, X75) |  | 50 | Even |  |
| Detail card −40 (X65) |  | 40 | Even | 40 |
| Detail card +80 | 80 |  |  |  |
|  | 80 | 90 | Even | 40 |
|  |  | →99919 | Odd |  |
|  | Carry | 100009 1 | Even |  |
| Print | 80 | 10* |  | 40 |

Analyzing Example "B" in connection with Fig. 20 it will be observed that the negative balance card contains X75 and X65 perforations so that the initial entry from the lower brushes (see Fig. 20) entered through socket 245, contacts 191b, 242d, and 191g, to accumulator III. The first detail card being negative, contacts 191b will close and the circuit will follow through 191b, 241c, to accumulator II. As pointed out above, the relays 242 and 243 set up under control of the balance card will remain conditioned throughout the analysis of the entire group of cards so that concurrently with the entry in accumulator II a parallel entry will follow through contacts 191b, 242d, 191g to accumulator III. The third detail being positive, the entry will follow through 191a, 240c to accumulator I. During the transfer cycle, since contacts 242c are closed and 243d open, the closure of contacts 191f will cause the amount in accumulator I to be transferred to accumulator III incidentally operating the double-step relay. Since a highest order carry is involved, the relay will be operated a second time and accumulator III will be conditioned to directly print the amount standing therein.

The printing of the true amount from accumulator III will be accompanied by the symbol ± to indicate that it is a minus balance and the selection of this character for printing will be set forth hereinafter.

In Example "C" the total of the negative items exceeds the total of the positive items and the first card contains a balance of +50. As before in Example "A", the negative items transferred in complementary form to the accumulator III change the double-step relay contacts to "odd" condition and since there is no highest order carry involved, the contacts remain in "odd" condition during total printing. Thus the emitter line transposing relay is energized and the complement of the number standing on the accumulator is printed with the appropriate symbol ±.

*Example C*

|  | Acc. I | Acc. III | Dsr. | Acc. II |
|---|---|---|---|---|
| Balance card +50 (X75) |  | 50 | Even |  |
| Detail card −120 (X65) |  |  |  | 120 |
| Detail card +40 | 40 | 40 | Even |  |
| Transfer | 40 | 90 | Even | 120 |
|  |  | 99879 | Odd |  |
|  |  | 99969 | Odd |  |
| Print | 40 | 30± |  | 120 |

In Example "D" following, the positive items exceed the negative items and the balance card carries a negative balance which enters the balance of 50 into accumulator III and selects the parallel connections as in Example "B" from accumulator II to III. As in that example, the positive amount is transferred in complementary form to accumulator III changing the double-step relay to "odd" condition which is maintained due to the absence of highest order carrying and again, as in Example "C", total printing will be of the complement of the number standing in the accumulator.

The total this time will be accompanied by an asterisk indicating that the balance printed is positive. In all the above examples the double-step relay receives impulses only during transfer cycles; that is, primary impulses on complementary addition and secondary impulses if such addition results in highest order carry.

*Example D*

|  | Acc. I | Acc. III | DSR. | Acc. II |
|---|---|---|---|---|
| Balance card −50 (X65, X75) |  | 50 | Even |  |
| Detail card −40 (X65) |  | 40 | Even | 40 |
| Detail card +120 | 120 |  |  |  |
|  | 120 | 90 | Even | 40 |
|  |  | →99879 | Odd |  |
| Transfer |  | 99969 | Odd |  |
| Print | 120 | 30± |  | 40 |

As is evident from the foregoing examples, the initial entry into the balance accumulator may condition either of the other accumulators to transfer its amount thereto in complementary form. If the initial balance entry is of a positive quantity, the transferring will take place from the accumulator in which negative detail amounts are accumulated and if the initial balance entry is negative, the transfer will take place from the accumulator receiving positive detail amounts. Further, if the initial balance entry is positive, the accumulator will also receive all positive detail amounts and if the initial entry is negative, it will receive all detail negative amounts.

Negative symbol printing

The manner in which the symbol ⁎ is printed to denote that the total is negative will now be described. The negative symbol is printed from the same type bar which prints the asterisk denoting a positive total. The asterisk is located on the type bar in the nine position and an impulse at the nine time to interrupt the bar will position the asterisk for printing. The negative sign ⁎ is located in the eight position on the type bar and an impulse at the eight time in the machine cycle will interrupt the bar with this symbol in printing position. For the Examples A, B, C, D, just explained, the selection of the negative symbol is jointly controlled by the balance card and the double-step relay contact condition. As explained above, the energization of relay magnet 243 (L16) under control of a negative balance card will cause closure of contacts 243a (C29) and opening of contacts 243b. These contacts are wired to plug sockets V—I and S—I from which connections 252 and 253 are made to plug sockets U—I and T—I as shown (see also Fig. 10). A further plug connection is made from plug socket F—I (R29) to the symbol printing type bar and switch S21c is moved to its dotted line position. It will be noted that the center contact blade of the lower pair of contacts 243a, 243b is connected through wire 184 to the emitting contact SP9 and the center blade of the upper pair is connected through a wire 255 to the emitting contact SP8. Thus, if the balance card is positive, the contacts 243a will remain in the position shown and if contacts 156d, 156e remain in the position shown, a circuit will be completed from the impulse emitting contact SP9, wire 184, contacts 243b, socket S—I, plug connection 253, to socket T—I, contacts 156d, switch S21c, socket F—I, plug connection 183 to the print magnet.

This circuit will be completed at the nine time to present the asterisk to printing position. The contacts 156d, 156e are associated with the reversing relay 156 of the accumulator selected for balance printing and shift when the relay reverses the contacts 156a, 156d (R34). Thus with an initial entry of a positive balance amount and the initiating of the double-step relay at "even" the circuit just traced will follow. This condition is such as brought about by Example "A". If the initial balance entry were negative, contacts 243a will be closed and the socket S—I will be connected to wire 255 and the "8" contact SP8 so that the circuit will be completed at the "8" time to present the negative symbol ⁎ to printing position. This condition is exemplified in Example "B" where the double-step relay is still in "even" condition. In Example "C", the initial positive balance entry will leave the contacts 243a, 243b as shown on the circuit diagram but contacts 156e will be closed so that the circuit will now follow from SP8, wire 255, upper contacts 243b, socket V—I, connection 252, to socket U—I, contacts 156e, to the print magnet as before to interrupt the bar in the "8" or negative symbol printing position. Finally, in Example "D" where contacts 243a are closed due to the negative balance entry and contacts 156e are closed due to the "odd" condition of the double-step relay, the circuit will follow from SP9, wire 184, lower contacts 243a, socket V—I, plug connection 252, to socket U—I, contacts 156e, to the print magnet in the "9" or asterisk printing position to designate a positive balance.

*Balance card listing control.* When the machine is conditioned for balancing it may be desirable to print in a column of the record only the balance amount on that card and suppress listing of amounts in the same field on succeeding cards so that a report may appear as follows:

| Bank 1—Debits | Bank 2—Credits | Bank 3—Old balance |
|---|---|---|
| | | 8,642 |
| 521 | 462 | |
| 634 | 642 | |
| 321 | 129 | |
| 1,476* | 1,233* | |
| | | 8,399* |

If a plug connection is made from socket A—5 (C29) to say socket B—6, then the associated printing bank will be rendered effective only when contacts 240i are closed. The controlling coil 240, as we have seen above, is energized upon the analysis of an X75 perforation and held energized until the balance card has been read by the lower brushes.

A similar plug connection to socket A—8 may be effected to another socket, as B—5, and if contacts 240j are closed due to a perforation in say the X80 position, the associated listing bank will operate to print the balance so designated under control of a separate relay 240.

Additional sockets A—6 and A—7 are provided the latter to complete a circuit when 240i and 191i are both closed in response to X75 and X65 perforations respectively, and the former when only an X65 perforation is present. This is useful in group indicating debit balances in one column and credit balances in another.

At C32 are shown sockets W—1 and W—2 in series with contacts 241i of separate relays 241. As explained relay 241 is energized upon sensing of a negative balance card and if sockets W—1 or W—2 are connected to special print magnet sockets X—1, X—2, etc. (C34) closure of contacts L16 will complete a circuit to interrupt the type bar in position to print a symbol indicative of the balance on line with the amount itself. Contacts L16 are timed to close at "7" time in the cycle and sockets X—1 etc. are associated with the asterisk type bar which is provided with a symbol "Db" or "Cr" as desired to print alongside one type of balance.

In the foregoing description it has been explained how balancing problems may be solved with the use of three accumulators and the separate totals printed in three columns with an asterisk accompanying credit balances and the symbol ⁎ accompanying the debit balance thus:

| Credit | Debit | Balance |
|---|---|---|
| 875 | 241 | 634* |
| or 241 | 875 | 634⁎ |

Provision is made for preparing a different form of report wherein credit and negative balances are printed in separate columns so that the symbols may be dispensed with thus:

| Db. Balance | Credit | Debit | Cr. Balance |
|---|---|---|---|
| | 875 | 241 | 634 |
| or 634 | 241 | 875 | |

The manner in which the balances are selectively printed in separate columns will now be described. Assuming that the balances are computed in Acc. V and that printing is to take place in Print bank V for credit balances and in Print bank II for debit balances. Plug connections are then made from the readout plugs 150 of Acc. V (Fig. 11d) to the total print sockets 148 of both bank II and V. The problem is then to selectively operate the total print selecting magnets 149 of banks II and V.

A plug connection 300 (Fig. 10) is made between socket C—1 (if minor totals are desired) and socket F—8, and further connections 301 and 302 are made between sockets D—5 and left hand socket G—8; and socket D—2 and right hand socket G—8. These sockets are shown in the circuit diagram at R20 where they are shown wired to relay contacts 79e, 79f, 242h and 242i. The contacts 79e, 79f are controlled by the double-step relay 79 of the Acc. V and as previously explained, if the balance standing thereon is positive, the contacts remain as shown, but if it is negative, 79f will close and 79e open. If positive, then during the total printing cycle the circuit from socket C—1 will follow to socket F—8, contacts 79e, 242h, left hand socket G—8, connection 301, to socket D—5 and selecting relay 149 of bank V to cause printing in that bank. If negative, the circuit will follow from C—1 to F—8, contacts 79f, 242h to right hand socket G—8, connection 302 to socket D—2 and selecting relay 149 of bank II to cause printing in that bank.

If balance cards are involved in the operation, the contacts 242h and 242i which are wired between sockets F—8 and G—8 will be brought into operation. As explained above, the controlling relay magnet 242 (L16) is energized and held in such condition whenever a negative balance card is analyzed. The effect of this is to close contacts 242i and open contacts 242h. Thus, the circuit from F—8 to left or right sockets G—8 will be selectively determined by the combination of conditions existing in the contacts wired between the sockets. In accordance with the conditions hereinbefore pointed out, the conditions which may exist can be set down in tabular form as follows:

| Acc. V | Record | |
|---|---|---|
| | Db. total | Cr. total |
| a. +Bal. card and true total | | Print. |
| b. −Bal. card and true total | Print. | |
| c. +Bal. card and complement total | Print. | |
| d. −Bal. card and complement total | | Print. |

Balancing with two accumulators

Another method of balancing to which the flexibility of the machine lends itself requires the use of but two accumulators plug-connected to cause entry of all debit items in one and all credit items in the second and arranged to cause a progressive total cycle to follow after a selected group change during which the totals in both accumulators will be printed. Following the progressive total cycle a single transfer cycle is initiated to cause transfer from one accumulator to the other complementarily. This will result in the balance appearing on the second accumulator which during the following total and reset cycle will be printed with the appropriate symbol to indicate the arithmetical sign of the balance.

A report so prepared may be illustrated as follows:

| Debit | Credit |
|---|---|
| 221 | |
| | 234 |
| | 122 |
| | 116 |
| 50 | |
| 271* | 472* |
| | 201* Balance |

As explained above this balance may also, instead of being printed in a particular column with the appropriate symbol *, be selectively printed in one or the other column accordingly as it is a debit or credit balance and the designation sign may be omitted.

Further method of balancing

The machine is adapted to perform balancing operations where groups of record cards include so-called balance cards which may be negative or positive. In the previous example it was explained how balancing may be effected where the balance card is placed at the head of its associated group. Another arrangement may be effected where the balance card is placed at the end of the group. With this type of operation a column of the card is set aside to receive designations indicating whether the card is a detail card or a balance card. For example, all detail cards may be punched "1" in, say, column 20 and the balance card punched "2" in the same column. This column is plug connected for minor control so that when the machine detects the change from "1" to "2" it will enter upon a progressive total cycle and will print the totals of the item cards.

Following this, card feeding is resumed and the balance card is analyzed and its amount printed. Since the balance card is the last card of a group, intermediate or major total taking operations will be initiated to cause a transfer cycle in which the amounts in the debit and credit accumulators are merged and the net balance printed. This operation will be diagrammatically illustrated as follows:

| Cycles | Major | Minor | Debit | Credit |
|---|---|---|---|---|
| 1st card | 1230 | 1 | 300 | |
| 2nd card | 1230 | 1 | | 20 |
| 3rd card | 1230 | 1 | 50 | |
| 4th card | 1230 | 1 | | 450 |
| Progressive total | | | 350* | 470* |
| Bal. card | 1230 | 2 | 50 | |
| Transfer | | | 400 ↳ | 99599 |
| | | | ↳Carry | 100069 1 |
| Total print | | | | 70* |

In this type of problem it will be appreciated that the balance may again be printed in either column under the appropriate headings or in the same column with a proper distinguishing designation.

While there has been shown and described and pointed out the fundamental novel features of the invention as applied to a single modication, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is as follows:

1. In a record controlled tabulating machine, a plurality of accumulators, an automatic group control mechanism responsive to minor, intermediate, and major group number changes on record cards, transferring mechanism for transferring amounts from one of said accumulators to another and means controlled by said control mechanism for effecting an operation of said transferring mechanism in response to any one of said types of group number change.

2. In a record controlled tabulating machine, a plurality of accumulators, an automatic group control mechanism responsive to minor, intermediate, and major group number changes on record cards, transferring mechanism for transferring amounts from one of said accumulators to another and means controlled by said control mechanism for selectively effecting an operation of said transferring mechanism in response to only two of said types of group number change.

3. In a record controlled tabulating machine, a plurality of accumulators, an automatic group control mechanism responsive to minor, intermediate and major group number changes on record cards, transferring mechanism for transferring amounts from one of said accumulators to another, means for effecting a predetermined number of uninterruptedly repeated operations of said transfer mechanism, and means controlled by said control mechanism for initiating said repeated operations in response to any one selected type of group number change.

4. In a machine of the class described, a plurality of accumulators, minor, intermediate, and major group control mechanism, transferring mechanism for transferring amounts from one accumulator to another, means effective upon a minor group number change for effecting an operation of part of said transfer mechanism to effect a transfer from one accumulator to a second, and means effective upon an intermediate change to effect an operation of another part of said transfer mechanism to effect a transfer from said second accumulator to a third.

5. In a machine of the class described, a plurality of accumulators, resetting mechanism and group control mechanism responsive to minor, intermediate and major group number changes, means for entering amounts in one of said accumulators, means operative upon a minor group change for transferring the total in said last named accumulator to a second accumulator and resetting the first, means operative upon an intermediate group change for transferring the total in said second accumulator to a third accumulator and resetting the second and means operative upon a major group change for printing the total in said third accumulator and resetting the same.

6. In an accounting apparatus, a plurality of accumulators, means for entering amounts in one of said accumulators, automatic control mechanism responsive to different types of group number changes, means operative upon one type of group number change for transferring the total in said amount receiving accumulator to another accumulator, and means operative upon another type of group number change for transferring the total in said other accumulator to a third accumulator whereby each succeeding accumulator will receive the total of the accumulator transferring thereto.

7. The invention set forth in claim 6 in which means is provided for preselecting the accumulators that are to control and receive transferred amounts for each type of group change.

8. In a tabulating apparatus, a plurality of record card controlled accumulators, means for sensing record card groups, group control mechanism responsive thereto, means operable by the aforesaid mechanism upon a change of record card groups for automatically initiating and effecting a succession of total transferring operations to successively transfer either the true amount or the complement of the amounts standing on certain accumulators to other accumulators and means including devices controlled by the transferring accumulators for determining the type of transfer to be effected from the same.

9. In a machine of the class described, means for analyzing a group of record cards containing a balance card having a negative or positive amount thereon with designations for identifying one class of amount and item cards having negative or positive amounts thereon, an accumulator, means for entering the amount on said balance card into said accumulator and means controlled by said analyzing means in accordance with the designation on said balance card for selectively entering negative or positive amounts from the item cards into said accumulator.

10. The invention set forth in claim 9 in which means is provided and controlled by said analyzing means for causing an entry of a negative balance amount to cause selection of negative item amounts and an entry of a positive balance amount to cause selection of positive amounts.

11. In a machine of the class described, means for analyzing a group of record cards containing a balance card having a negative or positive amount thereon, and item cards having negative or positive amounts thereon with designations for identifying one class of amount, a plurality of accumulators, means for entering positive items, negative items and balances into separate accumulators and means controlled by said analyzing means in accordance with the designation on said balance card for also entering positive or negative items from said item cards into the balance accumulator accordingly as the balance amount is positive or negative.

12. In a machine of the class described, a plurality of accumulators, means for analyzing amounts on record cards and entering the same into said accumulators, a plurality of means for transferring the amounts standing in certain of said accumulators to another of said accumulators and means controlled by one of said record cards for selectively determining from which of said certain accumulators transferring is to take place.

13. The invention set forth in claim 12 in which said determination is made before entries are made into the accumulators.

14. The invention set forth in claim 12 in which means is provided to cause the transfer between the accumulators to be of the complementary value of the amount standing on the selected accumulator.

15. In a machine of the class described, means for analyzing a group of records containing negative amounts or positive amounts thereon one of said kinds of amounts being distinguished from the other by a special designation, a plurality of accumulators, entering means therefor, and means controlled in accordance with the analysis of the first card of said group for controlling the operation of said entering means to cause one accumulator, to receive all negative or all positive amounts, a second accumulator to receive all negative amounts exclusive of that on the first card, and a third accumulator to receive all positive amounts exclusive of that on the first card.

16. In a machine of the class described, means for analyzing a group of record cards containing negative or positive amounts on each one of said kinds of amounts being distinguished from the other by a special designation, a plurality of accumulators, entering means therefor, transferring mechanism, means controlled in accordance with the analysis of the first card of said group for controlling the operation of said entering means to cause the entry of all positive or negative amounts into one accumulator, all negative amounts exclusive of that on the first card into a second accumulator, and all positive amounts exclusive of that on the first card into a third accumulator and further means controlled by the first card for selectively associating either the second or third accumulator with the first for transferring therebetween.

17. The invention set forth in claim 16 in which means is provided to cause transferring to be effected between the selected accumulators after entries have been effected from all the cards of the group.

18. The invention set forth in claim 22 wherein means is provided, if the balance card amount is negative, for entering all negative amounts into the first accumulator, all detail positive amounts into the second accumulator and all detail negative amounts into the third accumulator and means for thereafter entering the complement of the total in the second accumulator into the first accumulator.

19. In a machine of the class described, card analyzing mechanism, accumulators controlled thereby, transferring mechanism for transferring amounts from one to another of said accumulators, said transferring mechanism being adapted to effect transfer in either true or complementary form and a relay controlled jointly by said analyzing mechanism, transferring mechanism and one of said accumulators for determining the type of transfer to be effected.

20. In a tabulating machine, group indicating mechanism for printing group number designations after each group number change of successively analyzed record cards, minor, intermediate, and major group control mechanism responsive to changes in group control designations on the cards, and means selectively responsive to a change in any type of said control mechanism for initiating an operation of said group indicating mechanism to concurrently print only the designation corresponding to the effective type of group control change and the designations corresponding to lower orders of the group control mechanism.

21. In a machine of the class described, group indicating mechanism for printing group number designations after each group number change of successively analyzed record cards, group control mechanism having ranked sections, each section responsive to a different type of control designation, and means for causing said group indicating mechanism to concurrently print the designation corresponding to the section of the control mechanism corresponding to the type of control designation to which the mechanism responded and the designations corresponding to all sections of lower rank.

22. An apparatus for obtaining a balance of amounts contained on a group of record cards containing a prior balance card with arithmetical sign designations thereon and detail cards which includes three accumulators, means for determining the arithmetical sign of the balance card amount, means controlled thereby if the balance card amount is positive for entering all positive amounts into a first accumulator, all detail positive amounts into a second accumulator, and all detail negative amounts into a third accumulator, and means for thereafter entering the total of the amounts in the third accumulator in the form of a complement into the first accumulator.

23. In an accounting apparatus of the class described, two pairs of accumulators, means for entering amounts into each accumulator, means for automatically and concurrently transferring the amount in one of each pair of accumulators to the other of each pair of accumulators in the form of a complement, and means for transferring the amounts in one of said last-named accumulators to the other of said last-named accumulators to obtain a cross addition of the differences between the two pairs of amounts originally entered in the accumulators separately.

24. In a record controlled tabulating machine, a plurality of accumulators, an automatic group control mechanism responsive to minor, intermediate, and major group number changes on record cards, transferring mechanism for transferring amounts from one of said accumulators to another, means for initiating and effecting a single cycle of operations of said transferring mechanism upon a minor group change, and further means for initiating and effecting a plurality of operations of said transferring mechanism upon a major group change.

ULRICH M. W. KÖLM.